(12) United States Patent
Warren et al.

(10) Patent No.: US 11,710,825 B2
(45) Date of Patent: Jul. 25, 2023

(54) METAL CARBIDES AND METAL NITRIDES FOR A FLUORIDE ION BATTERY

(71) Applicants: The University of North Carolina at Chapel Hill, Chapel Hill, NC (US); Honda Motor Co., Ltd., Tokyo (JP)

(72) Inventors: Scott C. Warren, Chapel Hill, NC (US); Daniel L. Druffel, Carrboro, NC (US); Jacob Pawlik, Burlington, NC (US); Adam H. Woomer, Durham, NC (US); Qingmin Xu, Dublin, OH (US); Kaoru Omichi, Tochigi (JP); Christopher Brooks, Dublin, OH (US)

(73) Assignees: The University of North Carolina at Chapel Hill, Chapel Hill, NC (US); Honda Motor Co., Ltd., Tokyo (JP)

( * ) Notice: Subject to any disclaimer, the term of this patent is extended or adjusted under 35 U.S.C. 154(b) by 191 days.

(21) Appl. No.: 16/951,769

(22) Filed: Nov. 18, 2020

(65) Prior Publication Data

US 2021/0151755 A1    May 20, 2021

Related U.S. Application Data

(60) Provisional application No. 62/937,051, filed on Nov. 18, 2019.

(51) Int. Cl.
*H01M 4/58* (2010.01)
*H01M 10/05* (2010.01)
*C01B 32/914* (2017.01)

(52) U.S. Cl.
CPC ............. *H01M 4/58* (2013.01); *C01B 32/914* (2017.08); *H01M 10/05* (2013.01);
(Continued)

(58) Field of Classification Search
CPC ........ H01M 4/366; H01M 4/58; C01B 32/914
See application file for complete search history.

(56) References Cited

U.S. PATENT DOCUMENTS

2018/0309125 A1* 10/2018 Beidaghi ............... H01M 4/463

FOREIGN PATENT DOCUMENTS

WO    WO 2017-210587    * 12/2017

OTHER PUBLICATIONS

Hu et al., 2D Electrides as Promising Anode Materials for Na-Ion Batteries from First-Principles Study, ACS Appl. Mater. Interfaces 2015, 7, 24016-24022.

(Continued)

*Primary Examiner* — Brittany L Raymond
(74) *Attorney, Agent, or Firm* — Ballard Spahr LLP

(57) ABSTRACT

The invention generally relates to electrochemically active structures and methods of making thereof. More specifically, the invention relates to electrochemically active structure comprising a crystalline electride comprising a nitride or carbide of at least one of: an alkaline earth metal, a transition metal, a lanthanide metal, or a combination thereof, wherein the electride has a lattice capable of intercalating at least one ion, thereby releasing at least one electron into an external circuit; and wherein a change in lattice volume of the electride upon intercalating the at least one ion is less than about 40%. Further, methods of making these electrochemically active structures are disclosed. This abstract is intended as a scanning tool for purposes of searching in the particular art and is not intended to be limiting of the present invention.

19 Claims, 34 Drawing Sheets

(52) U.S. Cl.
CPC ...... *C01P 2002/85* (2013.01); *C01P 2004/03* (2013.01); *C01P 2004/61* (2013.01); *C01P 2004/62* (2013.01); *C01P 2004/64* (2013.01)

(56) References Cited

OTHER PUBLICATIONS

Hou et al., Two-Dimensional Y2C Electride: A Promising Anode Material for Na-Ion Batteries, J. Phys. Chem. 2016, 120, 18473-1847.

Chen et al., Multilayered Electride Ca2N Electrode via Compression Molding Fabrication for Sodium Ion Batteries, ACS Appl. Mater. Interfaces, 2017, 9, 6666-6669.

* cited by examiner

Activation Energy for F⁻ Hopping

| | $Sc_2C$ | $Y_2C$ |
|---|---|---|
| AA phase | 410 meV | 470 meV |
| ABC phase | ~1 eV | ~1 eV |

- Electrode peeled:
- r-Y2C structure is same as r-Y2C powder.

r-Y2C ball milled 4hrs

METAL CARBIDES AND METAL NITRIDES FOR A FLUORIDE ION BATTERY

CROSS-REFERENCE TO RELATED APPLICATIONS

This Application claims the benefit of U.S. Provisional Application No. 62/937,051, filed on Nov. 18, 2019, which is incorporated herein by reference in its entirety.

BACKGROUND

Increased demand for smaller and faster devices that have a long battery life revolutionized development of new electrochemical storage and conversion devices. The new developments expanded the capabilities of these systems in a variety of fields including portable electronic devices, air and spacecraft technologies, and biomedical instrumentation. These advanced electrochemical storage systems can be used in large variety of applications: from high energy density batteries exhibiting very low self-discharge rates and high discharge reliability for implanted medical devices to inexpensive, light weight rechargeable batteries providing long runtimes for a wide range of portable electronic devices to high capacity batteries for military and aerospace applications capable of providing extremely high discharge rates over short time periods.

The continuous demand for high power portable electronic products, for example, has created enormous interest in developing safe, lightweight primary and secondary batteries providing higher energy densities. The demand for miniaturization in the field of consumer electronics and instrumentation adds an additional challenge of creating novel designs and materials to reduce the size and mass of high performance batteries. Further, continued development in the fields of electric vehicles and aerospace engineering has also created a need for mechanically robust, high reliability, high energy density and high power density batteries capable of good device performance in a useful range of operating environments.

Lithium batteries are commonly used in a vast variety of applications. However, lithium metal is extremely reactive, particularly with water and many organic solvents, and this attribute necessitates use of additional materials such as, for example, an intercalation host material for the negative electrode. Use of an intercalation host material for the negative electrode, however, inevitably results in a cell voltage that is lower by an amount corresponding to the free energy of insertion/dissolution of lithium in the intercalation electrode. This requirement on the composition of the negative electrode also results in substantial loss in the specific energies achievable in these systems. Further, incorporation of an intercalation host material for the negative electrode does not entirely eliminate safety risks.

Thus, there is still a need for the storage systems that can be rechargeable and exhibit high charge density along with a safe operation. Still there is a need for method of making such storage systems.

SUMMARY

In accordance with the purpose(s) of the invention, as embodied and broadly described herein, the invention, in one aspect, relates to an electrochemically active structure comprising a crystalline electride comprising a nitride or carbide of at least one of: an alkaline earth metal, a transition metal, a lanthanide metal, or a combination thereof, wherein the electride has a lattice capable of intercalating at least one ion, thereby releasing at least one electron into an external circuit; and wherein a change in lattice volume of the electride upon intercalating the at least one ion is less than about 40%.

In yet other aspects, the invention relates to a battery comprising a cathode and an anode comprising a crystalline electride comprising at least one layer comprising a nitride or carbide of one or more of an alkaline earth metal, a transition metal, a lanthanide, or a combination thereof; wherein the electrode has a lattice capable of intercalating at least one ion, thereby releasing at least one electron into an external circuit; and wherein a change in lattice volume of the electride upon intercalating the at least one ion is less than about 40%; wherein the battery has an open circuit voltage from about 1.0 volts to about 4.5 volts and has a theoretical gravimetric energy density from about 300 to about 2,000 Wh/kg and a theoretical volumetric energy density from about 1300 and about 2800 Wh/L.

Also disclosed are methods comprising: contacting a compound represented by a formula $A_2N$, wherein A comprises Ca, Sr, Ba, Mg, Y, Sc, Gd, or a combination thereof with a solvent that does not substantially react with the compound for a period of time of at least 48 hours; and exfoliating a crystalline electride comprising at least one layer comprising at least one metal sub-nitride represented by a formula $A_2N$, wherein A comprises Ca, Sr, Ba, Mg, Y, Sc, Gd, or a combination thereof and one or more layers of anionic electrons; wherein the exfoliated crystalline electride has a lattice capable of intercalating at least one ion, thereby releasing at least one electron into an external circuit; and wherein a change in lattice volume of the electride upon intercalation is less than about 40%.

Even further disclosed herein are methods comprising reacting a metal represented by a formula A, wherein A comprises Ca, Sr, Ba, Mg, Y, Sc, Gd, or a combination thereof by reaction of with a carbon under conditions effective to form a compound represented by a formula $A_2C$; and size reducing the compound represented by a formula $A_2C$ wherein A comprises Ca, Sr, Ba, Mg, Y, Sc, Gd, or a combination thereof, to form a crystalline carbide electrode, wherein the carbide crystalline electrode has a lattice capable of intercalating at least one ion, thereby releasing at least one electron into an external circuit; and wherein a change in lattice volume of the electride upon intercalation is less than about 40%.

In still further disclosed are methods of making a battery comprising: providing an anode comprising a crystalline electride comprising at least one layer comprising at least one metal nitride or carbide represented by a formula $A_2B$, wherein A comprises an alkaline earth metal, a transition metals, a lanthanide, or a combination thereof; and wherein B is a nitrogen or carbon, wherein the electrode has a lattice capable of intercalating at least one ion, thereby releasing at least one electron into an external circuit; and wherein a change in lattice volume of the electride upon intercalation is less than about 40%; providing a cathode; and providing an electrolyte; wherein the battery has an open circuit voltage from about 1.0 volts to about 4.5 volts and has a theoretical gravimetric energy density from about 300 to about 2,000 Wh/kg and a theoretic volumetric energy density from about 1300 and about 2800 Wh/L.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

BRIEF DESCRIPTION OF THE DRAWINGS

The accompanying figures, which are incorporated in and constitute a part of this specification, illustrate several aspects and together with the description serve to explain the principles of the invention.

Figure 1:
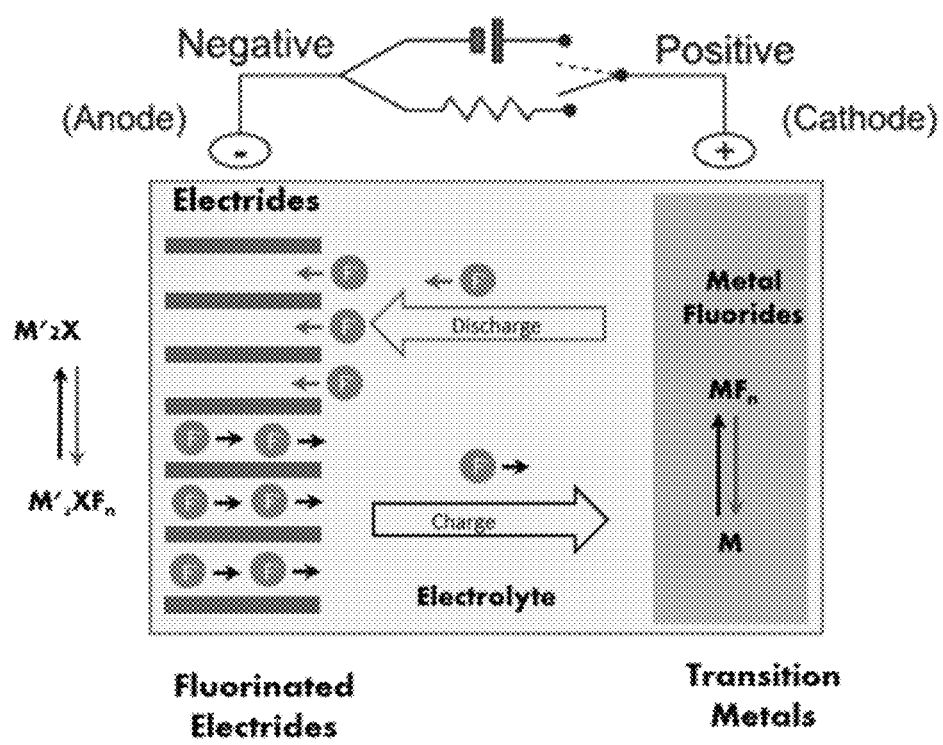
FIG. 1 depicts fluoride ion battery mechanisms. An example of fluoride ion battery with insertion-type electrides as anode and transition metal fluorides as cathode.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

The present invention can be understood more readily by reference to the following detailed description of the invention and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such may, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present invention is not entitled to antedate such publication by virtue of prior invention. Further, the dates of publication provided herein may be different from the actual publication dates, which can require independent confirmation.

DEFINITIONS

As used herein, nomenclature for compounds, including organic compounds, can be given using common names, IUPAC, IUBMB, or CAS recommendations for nomenclature.

As used in the specification and the appended claims, the singular forms "a," "an" and "the" include plural referents unless the context clearly dictates otherwise. Thus, for example, reference to "an electrode," "a cathode," or "an anode" includes two or more such electrodes, cathodes, anodes, and the like.

Ranges can be expressed herein as from "about" one particular value, and/or to "about" another particular value. When such a range is expressed, a further aspect includes from the one particular value and/or to the other particular value. Similarly, when values are expressed as approximations, by use of the antecedent "about," it will be understood that the particular value forms a further aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

References in the specification and concluding claims to parts by weight of a particular element or component in a composition denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent (wt. %) of a component, unless specifically stated to the contrary, is based on the total weight of the formulation or composition in which the component is included.

All percentages, ratios and proportions herein are by weight, unless otherwise specified. All temperatures are in degrees Celsius (° C.) unless otherwise specified.

Throughout the description and claims of this specification the word "comprise" and other forms of the word, such as "comprising" and "comprises," means including but not limited to, and is not intended to exclude, for example, other additives, components, integers, or steps.

As used herein, the term "substantially" means that the subsequently described event or circumstance completely occurs or that the subsequently described event or circumstance generally, typically, or approximately occurs. For example, when the specification discloses that the solvent does not substantially react with the crystalline electride, a person skilled in the relevant art would readily understand that the reaction does not have to be fully absent. Rather, this term conveys to a person skilled in the relevant art that the reaction between the solvent and the electride can be present to an extent that does not hinder desirable results or causes adverse effects.

As used herein, the terms "optional" or "optionally" means that the subsequently described event or circumstance can or cannot occur, and that the description includes instances where said event or circumstance occurs and instances where it does not.

As used herein, the terms "nanoparticles," "nanosheets," or "nanofilms" refer to particles, sheets, or films having nanoscale dimensions, for example dimensions greater than 0 nm and up to 500 nm, or greater than 500 nm and up to 1000 nm.

As used herein, the term "particle" refers to a small localized object to which can be ascribed several physical or chemical properties, for example, volume or mass. It is further understood the particle can be described by a length, width, and thickness. It is understood that the term particle refers to the object having both length and width substantially the same as its thickness, within no more than 1.25 times of its thickness, within no more than 1.5 times of its thickness, within no more than 1.75 times of its thickness, within no more than 2 times of its thickness, within no more than 2.25 times of its thickness, within no more than 2.5 times of its thickness, within no more than 2.75 times of its thickness, or within no more than 3 times of its thickness.

As used herein, the term "flake" refers to a small, flat, thin piece of material that typically has been peeled off from a larger piece. It is understood that the flake as described herein can be further described by a length, width, and thickness. It is further understood that the flake can be described as a flat material, in which its length is at least 3 times of its thickness, at least 3.5 times of its thickness, at least 4 times of its thickness, at least 5 times of its thickness, at least 6 times of its thickness, at least 7 times of its thickness, at least 8 times of its thickness, at least 9 times of its thickness, or at least 10 times of its thickness, while its width is substantially the same as its thickness, within no more than 1.25 times of its length, within no more than 1.5 times of its length, within no more than 1.75 times of its length, within no more than 2 times of its length, within no more than 2.25 times of its length, within no more than 2.5 times of its length, within no more than 2.75 times of its length, or within no more than 3 times of its length.

As used herein, the term "film" refers to a thin strip of material. It is understood that the film as described herein can be further described by a length, width, and thickness. It is further understood that the film can be described as a flat material, in which length and width are both at least 3 times of its thickness. For example, the length can be at least 3 times the thickness, at least 3.5 times the thickness, at least 4 times the thickness, at least 5 times the thickness, at least 6 times the thickness, at least 7 times the thickness, at least 8 times the thickness, at least 9 times the thickness, or at least 10 times the thickness. As further examples, the width can be at least 3 times the thickness, at least 3.5 times the thickness, at least 4 times the thickness, at least 5 times the thickness, at least 6 times the thickness, at least 7 times the thickness, at least 8 times the thickness, at least 9 times the thickness, at least 10 times the thickness, at least 100 times the thickness, at least 1,000 the thickness, at least 10,000 the thickness, at least 100,000 the thickness, at least 1,000,000 the thickness, or at least 10,000,000 the thickness, or from 3 times the thickness to 10,000,000 the thickness, or from 10 times the thickness to 1,000,000 the thickness.

It certain aspects, the particles described herein can have any desired particle size distribution characteristics. Exemplary particle size distribution characteristics can include predetermined values of $D_{(n)}$, where (n) represents a mass percentage such as 5%, 10%, 15%, 20%, 25%, 30%, 35%, 40%, 45%, 50%, 55%, 60%, 65%, 70%, 75%, 80%, 85%, 90%, 95%, or 100%. The value of $D_{(n)}$ thus represents the particle size of which (n) percentage of the mass is finer than. For example, the quantity $D_{(100)}$ represents the particle size of which 100% of a mass is finer than. The quantity $D_{(75)}$ represents the particle size of which 75% of a mass is finer than. The quantity $D_{(50)}$ is the median particle size of a mass for which 50% of the mass is finer than. The quantity $D_{(25)}$ represents the particle size of which 25% of a mass is finer than. The quantity $D_{(10)}$ represents the particle size of which 10% of a mass is finer than.

It will be understood that, although the terms "first," "second," etc. may be used herein to describe various elements, components, regions, layers and/or sections. These elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper," and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (e.g., rotated 90 degrees or at other orientations) and the spatially relative descriptors used herein interpreted accordingly.

As used herein, the term or phrase "effective," "effective amount," or "conditions effective to" refers to such amount or condition that is capable of performing the function or property for which an effective amount is expressed. As will be pointed out below, the exact amount or particular condition required will vary from one aspect to another, depending on recognized variables such as the materials employed and the processing conditions observed. Thus, it is not always possible to specify an exact "effective amount" or "condition effective to." However, it should be understood that an appropriate effective amount will be readily determined by one of ordinary skill in the art using only routine experimentation.

As used herein, the term or phrase "inert atmosphere" refers to a gaseous mixture that contains little or no oxygen and comprises inert or non-reactive gases or gases that have a high threshold before they react. An inert atmosphere may be, but is not limited to, molecular nitrogen or an inert gas, such as argon, or mixtures thereof.

As used herein, the term or phrase "reducing agent" refers to a substance that causes the reduction of another substance, while it itself is oxidized. Reduction refers to a gain of electron(s) by a chemical species, and oxidation refers to a loss of electron(s) by a chemical species.

As used herein, a "metal salt" is referred to an ionic complex wherein the cation(s) is(are) a positively charged metal ion(s) and the anion(s) is(are) a negatively charged ion(s). "Cation" refers to a positively charged ion, and "anion" refers to a negatively charged ion. In a "metal salt" according to the present disclosure, the anion may be any negatively charged chemical species. Metals in metal salts according to the present disclosure may include but are not limited to alkali metal salts, alkaline earth metal salts, transition metal salts, aluminum salts, or post-transition metal salts, and hydrates thereof.

"Alkali metal salts" are metal salts in which the metal ions are alkali metal ions, or metals in Group I of the periodic table of the elements, such as lithium, sodium, potassium, rubidium, cesium, or francium.

"Alkaline earth metal salts" are metal salts in which the metal ions are alkaline earth metal ions, or metals in Group II of the periodic table of the elements, such as beryllium, magnesium, calcium, strontium, barium, or radium.

"Transition metal salts" are metal salts in which the metal ions are transition metal ions, or metals in the d-block of the periodic table of the elements, including the lanthanide and actinide series. Transition metal salts include, but are not limited to, salts of scandium, titanium, vanadium, chromium, manganese, iron, cobalt, nickel, copper, zinc, yttrium, zirconium, niobium, molybdenum, technetium, ruthenium, rhodium, palladium, silver, cadmium, lanthanum, cerium, praseodymium, neodymium, promethium, samarium, europium, gadolinium, terbium, dysprosium, holmium, erbium, thulium, ytterbium, lutetium, hafnium, tantalum, tungsten, rhenium, osmium, iridium, platinum, gold, mercury, actinium, thorium, protactinium, uranium, neptunium, plutonium, americium, curium, berkelium, californium, einsteinium, fermium, mendelevium, nobelium, and lawrencium.

"Post-transition metal salts" are metal salts in which the metal ions are post-transition metal ions, such as gallium, indium, tin, thallium, lead, bismuth, or polonium.

A "halide salt" is an ionic complex in which the anion is halide ion, including but is not limited to fluoride ion, chloride ion, bromide ion, and iodide ion. A "fluoride salt" is an ionic complex in which the anion is fluoride ion. According to the present disclosure, the cation of the halide salt or the fluoride salt may be any positively charged chemical species.

A "metal fluoride" is an ionic complex in which the cation is a metal ion and the anion is fluoride ion. According to some aspects of the present disclosure, the metal salt and the fluoride salt react to create a metal fluoride shell around the metal nanoparticle core. Similarly, a "metal halide" is an ionic complex in which the cation is a metal ion and the anion is halide ion.

A "fluoride-containing" salt is an ionic complex in which the anion contain fluoride ion but are not limited to being solely fluoride. Instead, "fluoride-containing" salts include ionic complexes where the anion contains fluoride itself in complex with other ions or atoms. "Fluoride-containing" salts suitable for use in aspects of the present disclosure include those known to persons of ordinary skill in the art, including, but are not limited to, fluoride salts, non-metal fluoroanions such as tetrafluoroborate salts and hexafluorophosphate salts, and oxyfluoride salts. In some aspects of the present disclosure, the fluoride-containing salts can also include quaternary ammonium fluorides and fluorinated organic compounds. According to some aspects of the present disclosure, the metal salt and the fluoride-containing salt react to create a fluoride-containing shell around the metal nanoparticle core.

The term "electrode" refers to an electrical conductor where ions and electrons are exchanged with an electrolyte and an outer circuit. It is understood that the terms "positive electrode" and "cathode," as used herein, are used synonymously, can be used interchangeably, and refer to the electrode having the higher electrode potential in an electrochemical cell (i.e., higher than the negative electrode). It is further understood that the terms "negative electrode" and "anode," as used herein, are used synonymously, can be used interchangeably, and refer to the electrode having the lower electrode potential in an electrochemical cell (i.e., lower than the positive electrode). Cathodic reduction refers to a gain of electron(s) of a chemical species, and anodic oxidation refers to the loss of electron(s) of a chemical species. Positive and negative electrodes of the present invention may be provided in a range of useful configurations and form factors as known in the art of electrochemistry and battery science, including thin electrode designs, such as thin film electrode configurations.

The term "electrochemical cell" refers to devices and/or device components that convert chemical energy into electrical energy or vice versa. Electrochemical cells have two or more electrodes (e.g., positive and negative electrodes) and an electrolyte, wherein electrode reactions occurring at the electrode surfaces result in charge transfer processes. Electrochemical cells include, but are not limited to, primary batteries, secondary batteries, and electrolysis systems.

It is understood that the terms "primary battery" or "primary cells" can be used interchangeably and refer to non-rechargeable batteries. The terms "secondary batteries" or "secondary cells" can also be used interchangeably and refer to rechargeable batteries (or cells).

"Electrolyte" refers to an ionic conductor which can be in the solid state, the liquid state (most common), or more rarely a gas (e.g., plasma).

The term "gravimetric capacity" refers to a theoretical capacity of a specific material measured as a quantity of electricity involved in the electrochemical reaction per gram of the material.

The term "volumetric capacity" refers to a theoretical capacity of a specific material measured a quantity of electricity involved in the electrochemical reaction per volume of the material.

The term "reference electrode" as used herein refers to an electrode, which has a stable and well-known electrode potential. It is understood that the reference electrode performance depends on the surrounding media. Conventional reference electrodes are known as the aqueous reference electrodes and they include without limitations a standard hydrogen electrode (SHE), a normal hydrogen electrode (NHE), a reversible hydrogen electrode (RHE), a saturated calomel electrode (SCE), a copper-copper (II) sulfate electrode (CSE), a silver chloride electrode, a pH-electrode, a palladium hydrogen electrode, a dynamic hydrogen electrode (DHE), a mercury-mecurous sulfate electrode, and the like. It is further understood that use of aqueous reference electrodes in the non-aqueous media is undesirable. While for a short periods, it may be possible to use such aqueous electrodes as references with nonaqueous solutions the long-term results are not trustworthy. Using aqueous electrodes introduces undefined, variable, and unmeasurable junction potentials to the cell in the form of a liquid-liquid junction as well as different ionic composition between the reference compartment and the rest of the cell. In certain aspects, one of ordinary skill in the art can use of a quasi-reference electrode (QRE). QRE is based on ferrocene or another internal standard as cobaltocene or decamthylferrocene.

As used herein the term "solvent" refers to a component of a solution that is present in the greatest amount. It is further understood that solvent as described is the substance in which the solute is dissolved. It is understood that the term solvent as used herein should not be used in its narrow meaning that all solute in the solvent is fully dissolved. It would be clear to one of ordinary skill in the art that the solvent as described herein does not necessary fully dissolves the solute. In some embodiments, the solvent is inert to the solute and substantially no dissolution of the solute is observed. In other embodiments, the solvent can form a suspension with the solute. In still further embodiment, the solvent can react with the solute to produce a chemical reaction and form a new product. It is further understood that the solvent described herein can be any solvent known in the art and can include a liquid, gas, supercritical fluid, and solid. It is also understood that the solvents described herein can be liquid. The liquid solvents can be organic or inorganic, polar or non-polar, protic, aprotic, basic, acidic, or amphoteric.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific embodiment or combination of embodiments of the methods of the invention.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

ELECTROCHEMICALLY ACTIVE STRUCTURE

Fluoride ion batteries are considered to be the next generation energy storage, which offer up to 10 times more energy density than currently available lithium ion batteries. FIG. 1 depicts mechanism of fluoride ion batteries with insertion-type electrodes as anode and transition metal fluorides as cathode. During discharge in anode, fluoride ions in electrolyte hop into electrode interlayers and the anionic electrons move into external circuit, i.e., $[Y_2C]^{2+}(e^-)_2 + 2F^-_{(electrolyte)} \rightleftharpoons [Y_2C]^{2+}(F^-)_2 + 2e^-_{(circuit)}$; Meanwhile in the cathode, transition metal fluorides get electrons to reduce to metal or lower value metal fluorides. During charge vice versa.

The activation barrier of electron-fluoride exchange ($F^-$ diffusion) in $Y_2CF_2$ was calculated to 196 meV, lower than the barrier of $Li^+$ diffusion in both $LiCoO_2$ (~300 meV) and graphite (~260 meV). The lowest-energy pathway for $F^-$ diffusion in $Y_2CF$ is hopping of $F^-$ directly between tetrahedral sites, a distance of only 2.44 Å. This is expected to be the dominant mechanism of $F^-$ diffusion in the layered $Y_2C$ system.

Disclosed herein are electrochemically active structures comprising a crystalline electride. Electrides can be separated into two categories, organic and inorganic. Organic electrides are crystallized from an alkali or alkaline metal and a complexant, like crown ether. The packing of the complexed cations, which produce an image-positive charge in the cavities between cations, provide natural traps for anionic electronic charges. However, as one of ordinary skill in the art would readily appreciate these materials are highly unstable and decompose autocatalytically. Like their organic counterparts, inorganic electrides provide a framework, in this case a lattice of inorganic atoms, that forms an image-positive charge in cavities filled by anionic electrons. The two most important inorganic frameworks are nanoporous cage-structures like $12CaO \cdot 7Al_2O_3$, in which anionic electrons are trapped in 1D cages, and layered electrides like $Ca_2N$ in which electrons are trapped in 2D planes.

This disclosure relates to a crystalline electride comprising: at least one positively charged layer comprising at least one of an alkaline earth metal, a transition metal, a lanthanide metal or a combination thereof. In some aspects, the crystalline electrides comprise a nitride or carbide of one or more of Ca, Sr, Ba, Mg, Y, Sc, or Gd. In still further aspects, the electrides of the present invention comprises a nitride or carbide of one or more of Y, Sc, or Gd. In yet other aspects, the electrides of the current invention comprise a nitride. In still other aspect, the electrides of the current invention comprise a carbide. In still further aspects, it is understood that electrides comprise one or more layers of anionic electrons.

In certain aspects, the electrides can have a cage structure, in which anionic electrons are located within zero-dimensional cages. In other aspects, the electrides can have a layered structure.

Figure 2A:
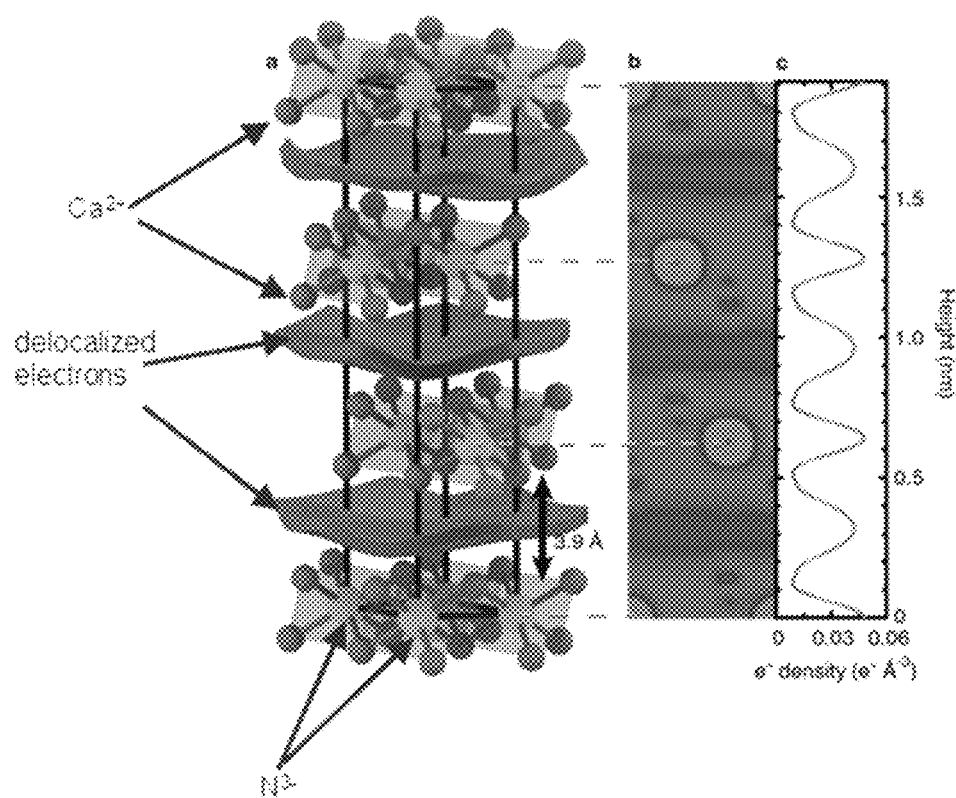
FIGS. 2A and 2B depict an exemplary crystalline structure of an exemplary $Ca_2N$ electride and $Sc_2C$ electride respectively.
Figure 2B:
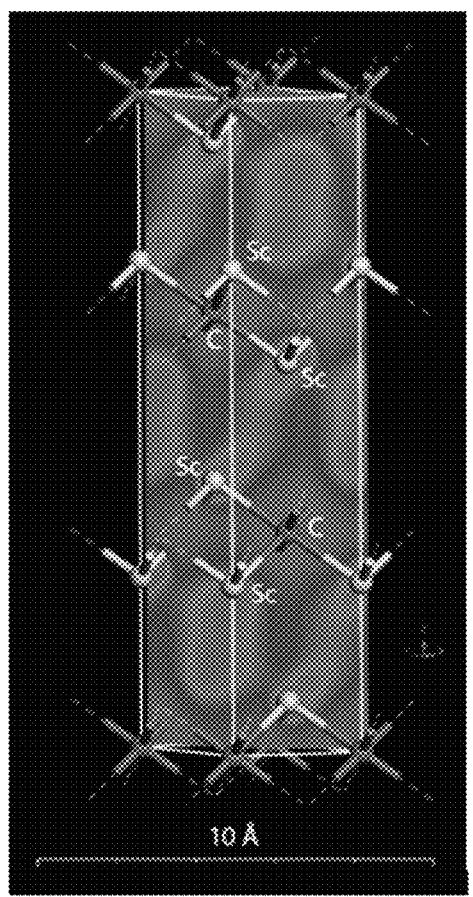

In an exemplary aspect, as depicted in FIG. 2A, the crystal structure of $Ca_2N$ is shown. In this aspect, planes of $Ca_6N$ octahedra are separated by a 3.9 Å interlayer gap. It is understood that due to the formal oxidation states of $Ca^{2+}$ and $N^{3-}$, the formula unit has a positive charge and is best represented as $[Ca_2N]^+$. Anionic electrons balance the positive charge of the $[Ca2N]^+$ layers by occupying the interlayer gap. It is understood that in some aspects, the anionic electrons are present in a stoichiometric relation with the positively charged layers to ensure net neutrality of the electride. The projections of electron density for the highest occupied band (−1.49 eV to EF, the Fermi level) shown in FIG. 2(B) were calculated using DFT model. An electron density profile was provided with respect to the z-axis of the hexagonal unit cell for this band (FIG. 2(C)). In certain aspects, the interlayer electron gas consists of ca. 0.7 electrons per formula unit. In one aspect, electrons per formula unit can be from 2.0 to 0.05, for example, from 1.0 to 0.2. In other aspects, the bands below the highest occupied band do not contribute additional electron density to the interlayer electron gas.

In yet other aspects, the electride described herein comprises one positively charged layer. In certain aspects wherein one positively charged layer is present, one or two layers of anionic electrons is also present. In such aspects, the layer of anionic electrons can be present substantially near the surface of the positively charged layer.

In still further aspects, at least two layers of anionic electrons can be present, wherein the one positively charged layer is present. In such aspects, these two layers of anionic electrons can form a surface electron gas surrounding at least one positively charged layer. In yet other aspects, it is understood that the one or more layers of anionic electrons can form a surface electron gas surrounding at least one positively charged layer.

In still further aspects, three positively charged layers are present, wherein two anionic electrons layers disposed in interlayer space between the two or more positively charged layers.

In some aspects, the electride as described herein can comprise two or more positively charged layers. In other aspects, the electride has a predetermined interlayer distance. In still further aspects, one layer of anionic electrons can be disposed in interlayer space between the two or more positively charged layers.

In other aspects, in the electrides having layered structures, the anionic electrons can be found in two-dimensional (2D) planes. In certain aspects, in layered electrides, the proximity of the anionic electrons causes them to partially delocalize as a 2D electron gas. The electron gas enables high electrical mobility, high carrier concentrations, and rapid electrical transport to the material's surfaces.

In certain aspects, the electrical mobility can be from about 0.001 to about 5000 $cm^2 V^{-1}s^{-1}$ at room temperature. In yet other aspects, the electrical mobility is about 1, about 10, about 160 $cm^2 V^{-1}s^{-1}$, about 500 at room temperature.

In certain aspects, the carrier concentration in the inventive electrides is from about $10^{18}$ to about $10^{23}$ $cm^{-3}$, for example from about $10^{19}$ to about $10^{23}$ $cm^{-3}$, from about $10^{20}$ to about $10^{23}$ $cm^{-3}$, or from about $10^{21}$ to about $10^{23}$ $cm^{-3}$. In still further aspects, the carrier concentration is about $6 \times 10^{21}$ $cm^{-3}$, about $1.4 \times 10^{22}$ $cm^{-3}$, about $4 \times 10^{22}$ $cm^{-3}$.

In still further aspects, the electrides of the current invention have a lattice capable of intercalation at least one ion per formula unit, thereby releasing at least one (1) electron into an external circuit. The predetermined interlayer distance can be from about 1.5 Å to about 5 Å, including exemplary values of about 1.60 Å, about 1.70 Å, about 1.8 Å, about 1.90 Å, about 2.00 Å, about 2.10 Å, about 2.20 Å, about 2.30 Å, about 2.40 Å, about 2.50 Å, about 2.60 Å, about 2.70 Å, about 2.80 Å, about 2.9 Å, about 3.0 Å, about 3.1 Å, about 3.2 Å, about 3.3 Å, about 3.4 Å, about 3.5 Å, about 3.6 Å, about 3.7 Å, about 3.8 Å, about 3.9 Å, about 4.0 Å, about 4.1 Å, about 4.2 Å, about 4.3 Å, about 4.4 Å, about 4.5 Å, about 4.6 Å, about 4.7 Å, about 4.8 Å, and about 4.9 Å. It is understood that specific interlayer distance of the electride depends on its chemical structure. For example, and without limitations $Mg_2N$ nitrides can have an interlayer lattice of about 2.93 Å, while $Ba_2N$ has an interlayer lattice of about 4.52 Å, and $Y_2C$ has an interlayer lattice of about 3.19 Å.

In certain aspects, the ion that is intercalated within an electride lattice is an anion. It is understood that any anions known in the art and suitable for a particular operation can be utilized. In certain aspects, anions comprise halides. In still further aspects, the anion can be fluoride, iodide, chloride, or bromide.

Figure 3:
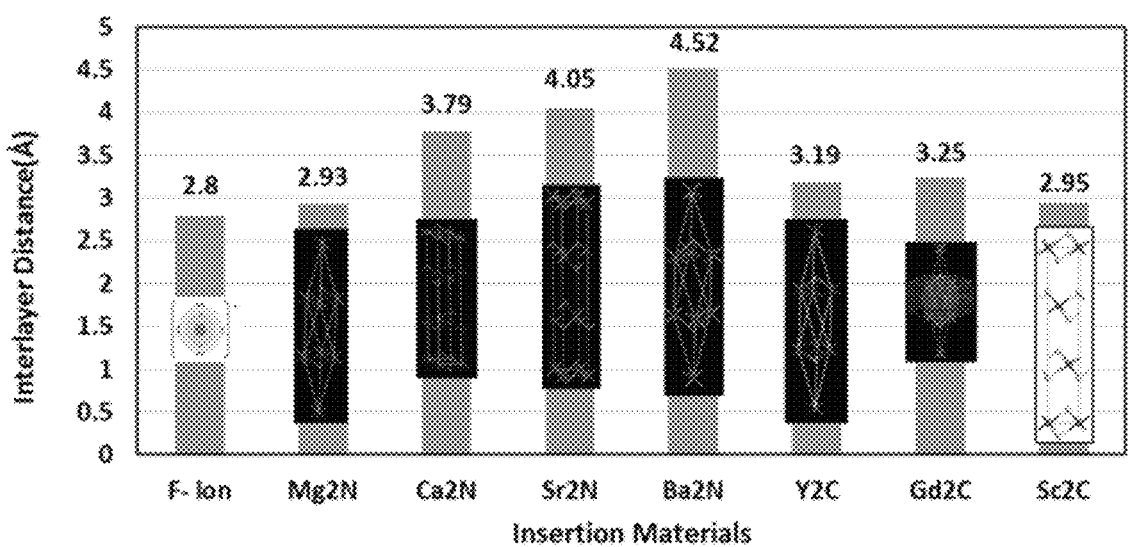
FIG. 3 depicts a graph of interlayer distance of various nitrides and carbides vs. Fluoride ($F^-$) ion diameter.

In still further aspects, the electrides of the current invention have a lattice volume from about 50 cubic angstroms to about 500 cubic angstroms. FIG. 3 depicts a graph of interlayer distance of various nitrides and carbides vs Fluoride ($F^-$) ion diameter.

Figure 4:
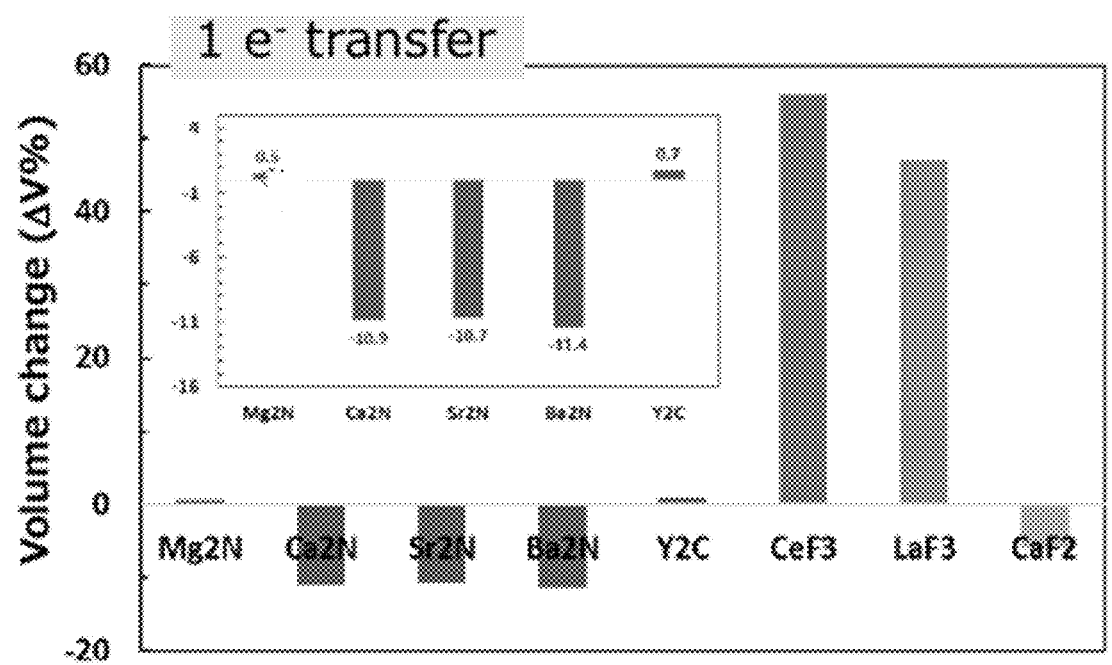
FIG. 4 depicts a graph of volume change comparison of insertion-type (various nitrides and carbides with a transfer of one (1) electron) and conversion-type (Ce, La, and Ca) anode materials.

In certain aspects, the electrides of the current invention has a substantially small lattice volume change upon intercalation of at least one ion. In some aspects, the change in a lattice volume of the electride upon intercalating the at least one ion is less than about 50%, less than about 40%, less than about 30%, less than about 20%, less than about 10%, less than about 5%, less than about 2%, less than about 1%, less than about 0.5%, or less than about 0.1%. In yet other aspects, the electrides of the current disclosure exhibit substantially no change in the lattice volume upon intercalating the at least one ion. FIG. 4 depicts a graph of volume change of various nitrides and carbides with a transfer of one electron.

As one of ordinary skill in the art would readily appreciate, in certain aspects, the change in the lattice volume needs to be compared to an interlayer distance of the specific electrides. The change in the lattice volume relatively to the predetermined interlayer distance can define whether the electride is capable of reversible intercalating at specific conditions. It is understood that the electrides having the small volume changes coupled with the larger interlayer distances can show a reversible intercalation and thus can be used in secondary cells. For example, and without limitations, $Y_2C$ and $Sc_2C$ electrides demonstrate smaller volume change coupled with a large interlayer distance, and thus, can be potentially used in the secondary cells.

Figure 5:
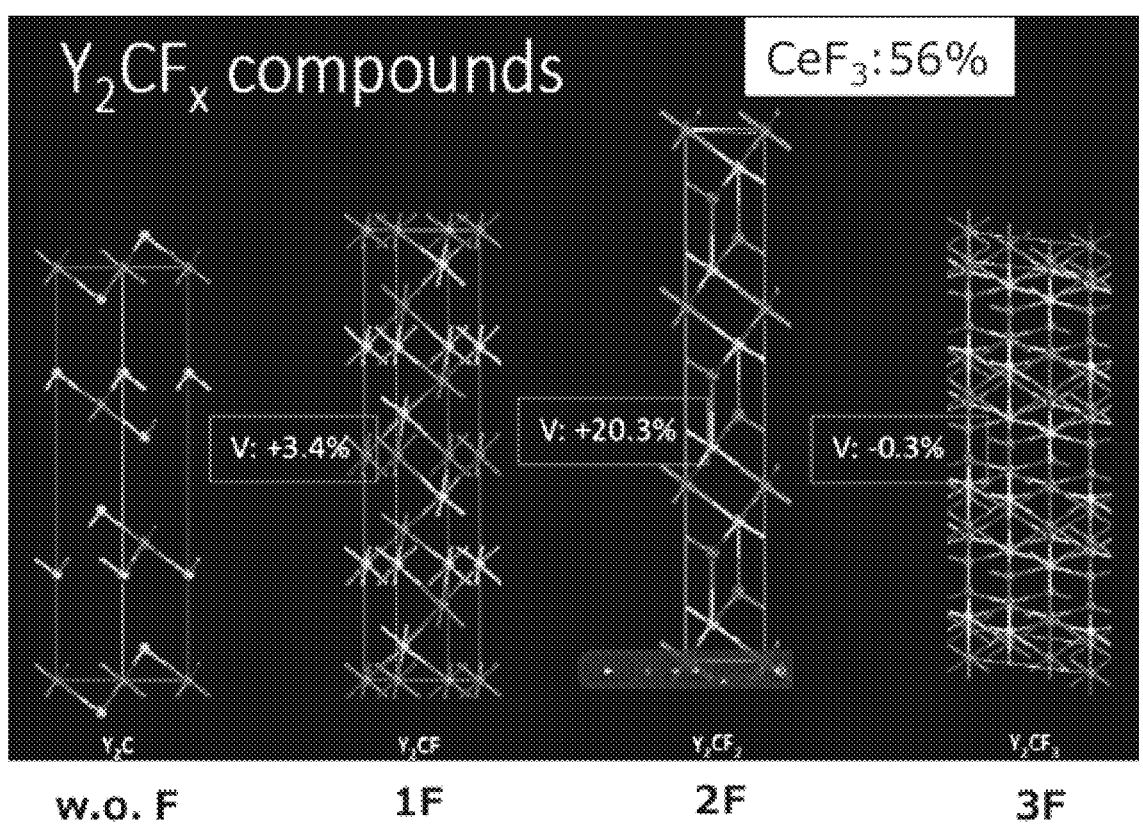
FIG. 5 depicts theoretical calculations of the volume change in $Y_2C$ with intercalation of one to three fluoride ions within $Y_2C$ matrix.

In still further aspects, the electrides of the current invention are capable of intercalating at least two ions and thereby releasing at least two electrons into the external circuit. In still further aspects, the electrides of the current invention are capable of intercalating at least three ions and thereby releasing at least three electrons into the external circuit. FIG. 5 depicts theoretical calculation of the volume change in $Y_2C$ with intercalation of one to three fluoride ions within $Y_2C$ matrix.

It is understood that intercalation of anion, such as for example, fluoride ion can be done according to the following half-cell reactions (equations 1-3):

In still further aspects, the disclosed electrides of the inventive electrochemical active structure can exhibit a theoretical gravimetric capacity from about 140 mAh/g to about 650 mAh/g, including exemplary values of about 150 mAh/g, about 200 mAh/g, about 250 mAh/g, about 300 mAh/g, about 350 mAh/g, about 400 mAh/g, about 450 mAh/g, about 500 mAh/g, about 550 mAh/g, and about 600 mAh/g. It is understood that the electrides of the current disclosure can have any theoretical gravimetric capacity between any two foregoing values. For example and without limitations, the theoretical gravimetric capacity can be between 140 mAh/g to about 250 mAh/g, or from about 200 mAh/g to about 450 mAh/g. The exemplary theoretical gravimetric capacity vs number of electrons being transfer is shown in Table 1.

TABLE 1

| Capacity vs. $e^-$ transfer | | | |
|---|---|---|---|
| Electride composition | Fluorinated product | Number of electrons, n | Gravimetric capacity (mAh/g) |
| $Y_2C$ | $Y_2CF$ | 1 | 141.19 |
| $Y_2C$ | $Y_2CF_2$ | 2 | 235.30 |
| $Y_2C$ | $Y_2CF_3$ | 3 | 423.57 |

Figure 6:
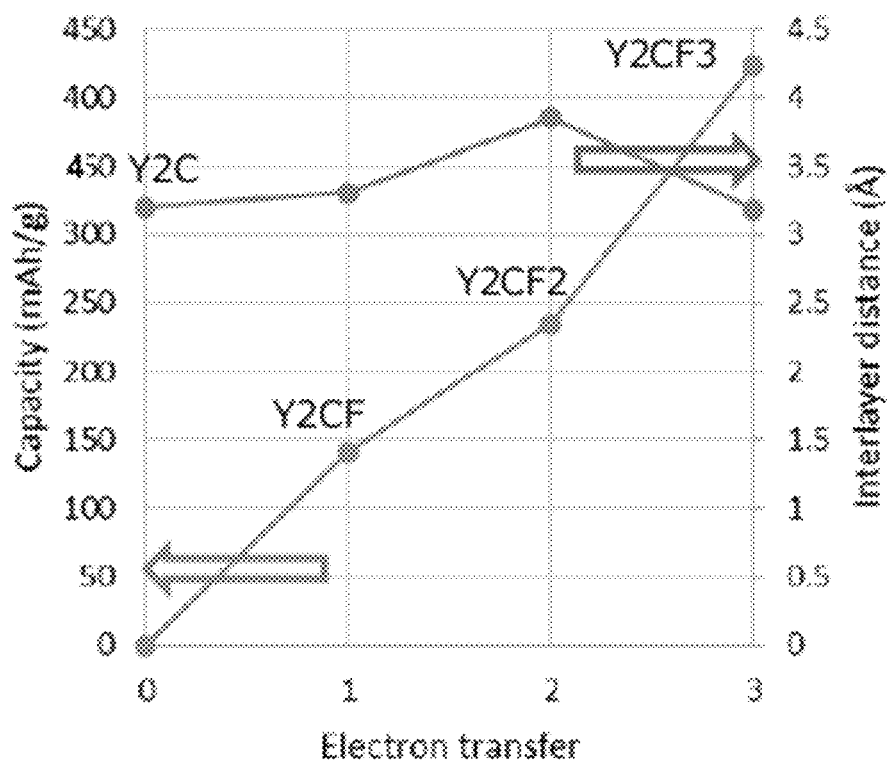
FIG. 6 depicts a gravimetric capacity and an interlayer distance of various $Y_2C$ compounds as a function of a number of transferred electrons.

FIG. 6 also depicts a plot showing a theoretical gravimetric capacity and an interlayer distance of various $Y_2C$ compounds as a function of a number of transferred electrons. As it can be seen in FIG. 6 there is a substantially linear dependence between the theoretical gravimetric capacity of the disclosed electrides and the number of transferred electrons.

In yet other aspects, the electrides disclosed herein exhibit a theoretical volumetric capacity from about 100 mAh/cm³ to about 2,500 mAh/cm³, for example from about 500 mAh/cm³ to about 1,800 mAh/cm³, or from about 800 mAh/cm³ to about 1,500 mAh/cm³, including exemplary value of 1300 mAh/cm³.

In still further aspects, the intercalation voltage of the at least one ion into the disclosed electride is dependent on the specific electride. The intercalation voltage is defined by a half-reaction (e.g., presented by equations 1-3) of the at least one electron released into the external circuit. This voltage is usually measured vs a reference electrode. In certain aspects, the half reaction of at least one electron released into the external circuit exhibits a voltage from 0 V to −3.5 V as measured vs an Ag/AgCl reference electrode, for example from lower than 0 V to −3.5 V as measured vs an Ag/AgCl reference electrode, from −1.0 V to −3.0 V as measured vs an Ag/AgCl reference electrode, or from −2.0 V to −3.0 V as measured vs an Ag/AgCl reference electrode, including exemplary values of −2.2 V for $Y_2C$ and −2.8 V vs. Ag/AgCl for $Ca_2N$. It is understood that the reference electrode can be any electrode described herein. In certain aspects, the reference electrode can comprise an Ag/AgCl reference electrode. It is further understood that the intercalation voltage is dependent on the number of ions being intercalated.

Table 2 shows a calculated model, using DFT (density functional theory with PBE functional), of change in the free energy (ΔG) and the voltage vs. Ag/AgCl reference electrode upon intercalation of two electrons in the exemplary $Y_2C$ and $Sc_2C$ electrides.

TABLE 2

Calculated Free Energy Gradient and Intercalation Voltage

| Electride material | Intercalated material | $\Delta G_{rxn}$ (kJ/mole) | ΔV % (lattice volume change upon intercalation) | V, voltage, vs Ag/AgCl reference electrode |
|---|---|---|---|---|
| $Y_2C$ | $Y_2CF_2$ | −336 | +26% | −2.1 |
| $Sc_2C$ | $Sc_2CF_2$ | −377 | +22% | −2.3 |

It can be seen, for example, and without limitations, that fluoride ion can be intercalated into $Sc_2C$ electride at more negative potentials than when it is intercalated into $Y_2C$. In still further aspects, the potential disclosed herein does not comprise the solvation energy of the at least one ion.

Figure 7:
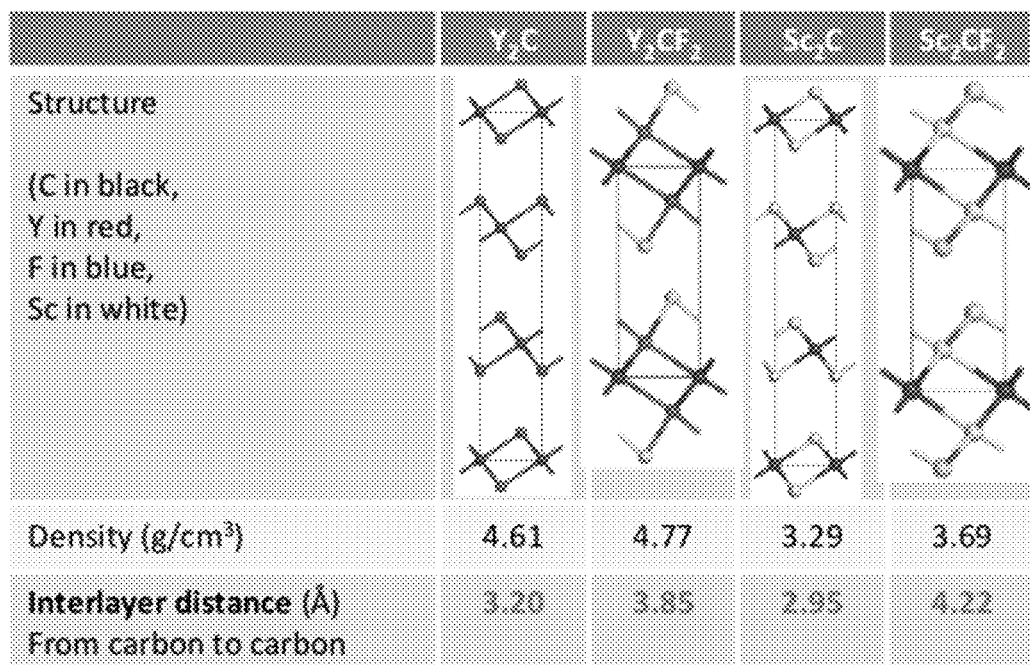
FIG. 7 depicts theoretical calculations of a change in a density and an interlayer distance of $Y_2C$ and $Sc_2C$ upon intercalation of two fluoride ions.

FIG. 7 further depicts theoretical calculations of change in a density and an interlayer distance of $Y_2C$ and $Sc_2C$ upon intercalation of two fluoride ions. It can be seen that intercalation of two fluoride ions can change the interlayer distance by about 20% for $Y_2C$ and by about 43% for $Sc_2C$, while it can change the density by about 3% and about 12% respectively.

In still further aspects, the electrides of the present disclosure can have any crystalline lattice. In some aspects, the crystalline lattice of the electrides has an AA phase, an AB phase, an ABC phase, or a combination thereof. For example, the ABC phase can be $Y_2C$, $Sc_2C$, or $Ca_2N$. In another example, the AA phase can be $Y_2CF_2$.

Figure 8:
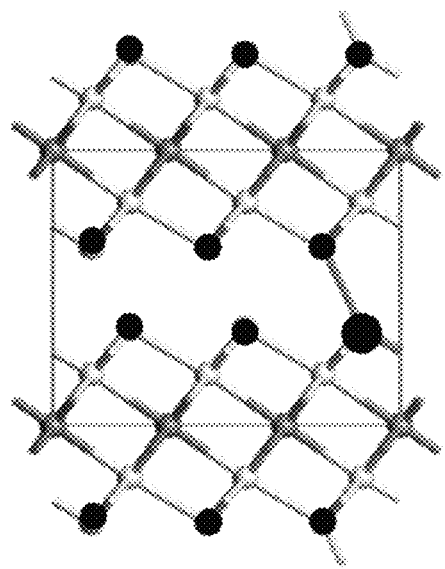
FIG. 8 depicts a calculated activation energy for a fluoride ($F^-$) ion hopping (the activation energy is calculated to move a fluoride to a vacancy site from a filled site).

The calculated activation energy required to move a fluoride ion to a vacancy site from a filled site for $Sc_2C$ and $Y_2C$ electrides is shown in Table 3 and FIG. 8. The vacancy sites are shown in a large black circle in FIG. 8, while the filled sites are shown in small black circles.

TABLE 3

Calculated activation energy for F⁻ hopping

| Lattice Phase | $Sc_2C$ | $Y_2C$ |
|---|---|---|
| AA phase | 100 meV | 90 meV |
| ABC phase | ~1 eV | ~1 eV |

Figure 9:
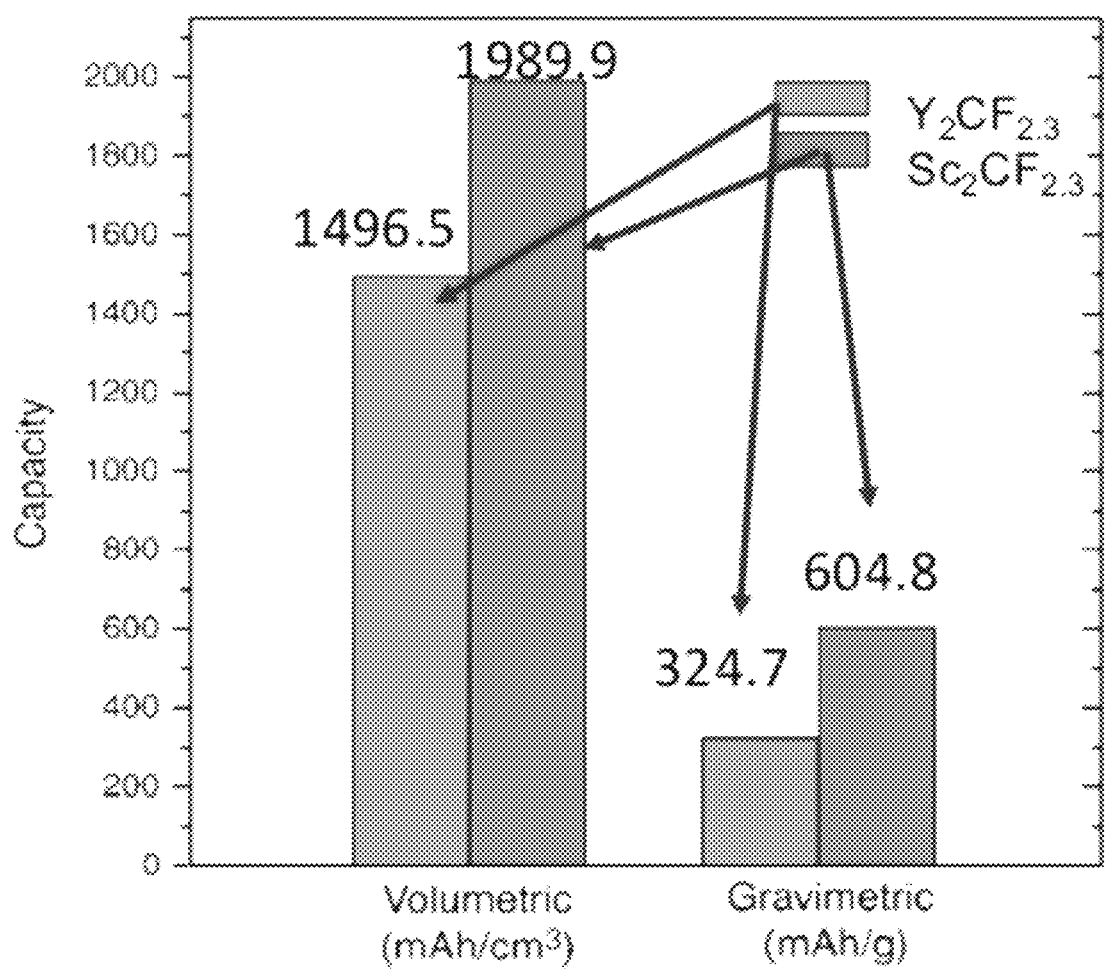
FIG. 9 depicts a comparison of volumetric and gravimetric capacity calculated for $Y_2CF_{2.3}$ and $Sc_2CF_{2.3}$.

It was shown that fluoride ion transport is significantly faster in the AA phase ($Sc_2C$) than the ABC phase ($Y_2C$). Similarly, both gravimetric and volumetric capacity of the $Sc_2C$ electride is higher than those of $Y_2C$. FIG. 9 shows the volumetric and gravimetric capacities as they are calculated for $Y_2C$ and $Sc_2C$ electrides upon intercalation of 2.3 fluoride ions.

Figure 10:
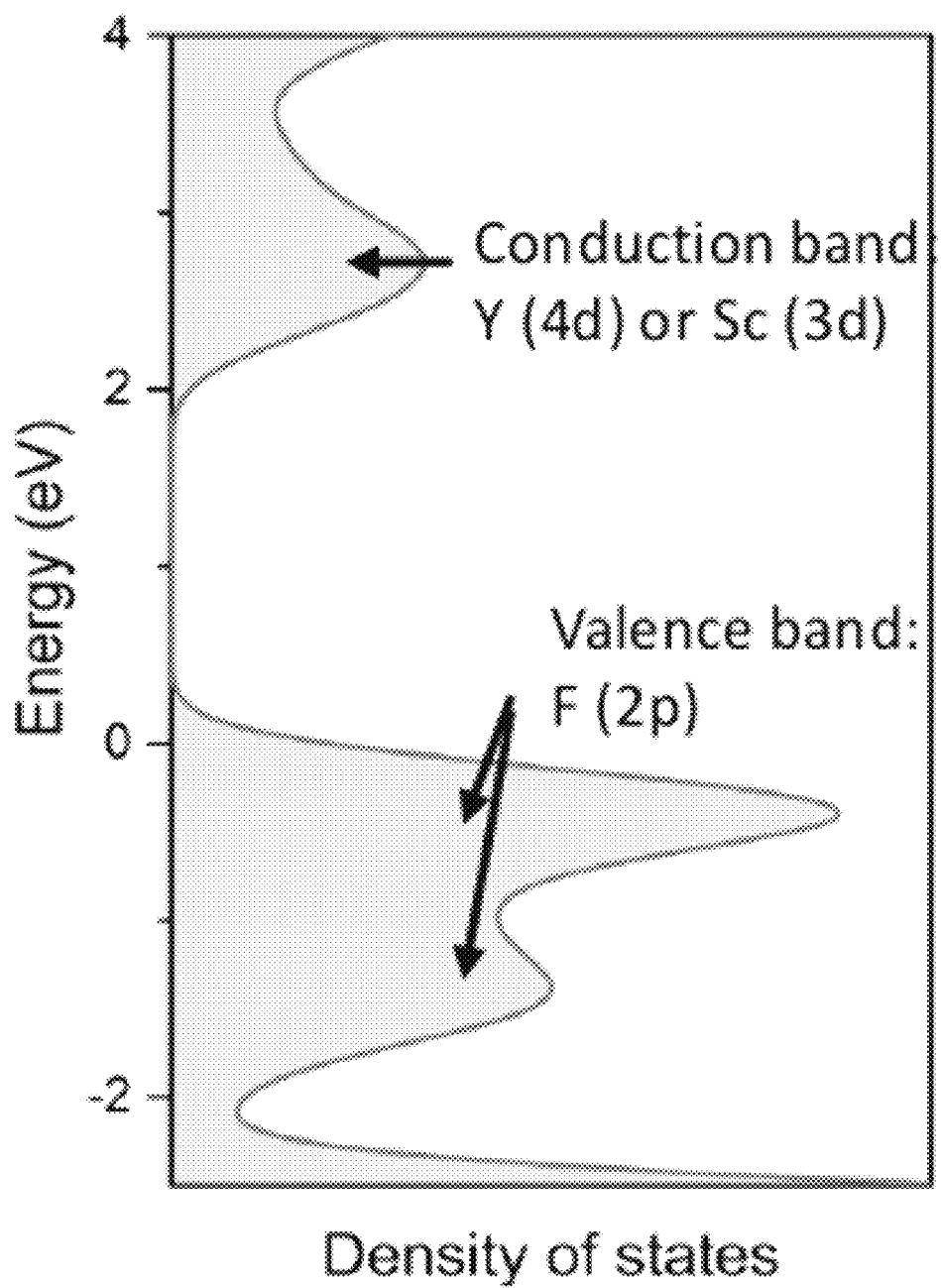
FIG. 10 depicts a schematic for conduction and valences bands for $Y_2CF_2$ and $Sc_2CF_2$.

In still further aspects, the electrochemically active structures of the present invention, comprise electrides having a lattice capable of reversibly intercalating the at least one ion. In certain aspects, the electride after intercalation of at least one ion, has a band gap from about 0 eV to about 7.0 eV. For example, the electride after intercalation of at least one ion, can have a band gap from about greater than 0 eV to about 7.0 eV, from about 1.0 eV to about 6.0 eV, or from about 1.0 eV to about 3.0 eV. FIG. 10 shows a schematic of conduction and valence bands for exemplary electrides $Sc_2C$ and $Y_2C$ upon intercalation of two fluoride ions. The band gap calculated by HSE-06 method for $Sc_2CF_2$ is 2.07 eV, while the band gap calculated for $Y_2CF_2$ is 1.88 eV. As it shown in FIG. 10, the conduction band of such electrides comprises primarily Y and Sc, while the valence band is primarily F in character.

In still further aspects, it is understood that the electrides of the present disclosure are capable of intercalating two or more ions that are not the same. In some aspects, the electrides are capable of intercalating an additional ion having a size larger than the at least one ion. In some other aspects, the intercalation of the additional ion does not result in releasing an electron into the external circuit. It is understood that in such aspects, the additional ion can prevent a change in the lattice volume upon interacting of the at least one ion. In some exemplary aspects, at least one ion can comprise a fluoride ion, while an additional ion can comprise a chloride, or a bromide, or an iodide ion. In still further aspects, the additional ion is chloride.

In some aspects, the electrides of the present disclosure can be present as a film, a flake, a particle, or any combination thereof.

In some aspects, the electride is present as a film. In such aspects, the film can have a length from greater than 0 nm to about 10 m, from greater than 0 nm to about 1 m, from greater than 0 nm to about 100 cm, from greater than 0 nm to about 10 cm, from greater than 0 nm to about 1 cm, from greater than 0 nm to about 1 mm, from greater than 0 nm to about 100 μm, including exemplary values of about 5 nm, about 10 nm, about 20 nm, about 30 nm, about 40 nm, about 50 nm, about 60 nm, about 100 nm, about 150 nm, about 200 nm, about 250 nm, about 300 nm, about 400 nm, about 500 nm, about 600 nm, about 700 nm, about 800 nm, about 900 nm, about 1 μm, about 2 μm, about 3 μm, about 4 μm, about 5 μm, about 6 μm, about 7 μm, about 8 μm, about 9 μm, about 10 μm, about 20 μm, about 30 μm, about 40 μm, about 50 μm, about 60 μm, about 70 μm, about 80 μm, and about 90 μm. It is understood that the electride can have any length between the any two foregoing values.

In yet other aspects, the electride is present as a film having a width from greater than 0 nm to about 100 cm, from greater than 0 nm to about 10 cm, from greater than 0 nm to about 1 cm, from greater than 0 nm to about 1 mm, from greater than 0 nm to about 100 μm, including exemplary values of about 3 nm, about 10 nm, about 20 nm, about 30 nm, about 40 nm, about 50 nm, about 60 nm, about 100 nm, about 150 nm, about 200 nm, about 250 nm, about 300 nm, about 400 nm, about 500 nm, about 600 nm, about 700 nm, about 800 nm, about 900 nm, about 1 μm, about 2 μm, about 3 μm, about 4 μm, about 5 μm, about 6 μm, about 7 μm, about 8 μm about 9 μm, about 10 μm, about 20 μm, about 30 μm, about 40 μm, about 50 μm, about 60 μm, about 70 μm, about 80 μm, and about 90 μm. It is understood that the electride can have any width between the any two foregoing values.

In still further aspects, electride is present as a film having a width from greater than 0 nm to about 100 cm and a length from greater than 0 nm to about 10 m, wherein each of the width and the length can have any values between any two foregoing values.

In still further aspects, the electride is present as a flake. In such aspects, the flake can have a length from greater than 0 nm to about 100 μm, including exemplary values of about 3 nm, about 10 nm, about 20 nm, about 30 nm, about 40 nm, about 50 nm, about 60 nm, about 100 nm, about 150 nm, about 200 nm, about 250 nm, about 300 nm, about 400 nm, about 500 nm, about 600 nm, about 700 nm, about 800 nm, about 900 nm, about 1 μm, about 2 μm, about 3 μm, about 4 µm, about 5 µm, about 6 µm, about 7 µm, about 8 µm, about 9 µm, about 10 µm, about 20 µm, about 30 µm, about 40 µm, about 50 µm, about 60 µm, about 70 µm, about 80 µm, and about 90 µm. It is understood that the electride that is present as a flake can have any length between the any two foregoing values.

In still further aspects, the electride is present as a flake having a width from greater than 0 nm to about 100 µm, including exemplary values 3 nm, about 10 nm, about 20 nm, about 30 nm, about 40 nm, about 50 nm, about 60 nm, about 100 nm, about 150 nm, about 200 nm, about 250 nm, about 300 nm, about 400 nm, about 500 nm, about 600 nm, about 700 nm, about 800 nm, about 900 nm, about 1 µm, about 2 µm, about 3 µm, about 4 µm, about 5 µm, about 6 µm, about 7 µm, about 8 µm about 9 µm, about 10 µm, about 20 µm, about 30 µm, about 40 µm, about 50 µm, about 60 µm, about 70 µm, about 80 µm, and about 90 µm. It is understood that in such aspects, the electride can have any width between the any two foregoing values.

In aspects where the electride is present as a film or a flake, the electride can have a thickness from greater than 0 nm to about 50 nm. In yet other aspects, such electrides can have a thickness from greater than 0 nm, about 1 nm, about 2 nm, about 5 nm, about 8 nm, about 10 nm, about 12 nm, about 15 nm, about 18 nm, about 20 nm, about 22 nm, about 25 nm, about 28 nm, about 30 nm, about 32 nm, about 35 nm, about 38 nm, about 40 nm, about 42 nm, about 45 nm, about 48 nm, or about 50 nm.

In still further aspects, the electrides can be present as particles. In such aspects, the particles can have a size from about 100 nm to about 150 µm, including exemplary values of about 200 nm, about 300 nm, about 400 nm, about 500 nm, about 600 nm, about 700 nm, about 800 nm, about 900 nm, about 1 µm, about 2 µm, about 3 µm, about 4 µm, about 5 µm, about 6 µm, about 7 µm, about 8 µm, about 9 µm, about 10 µm, about 20 µm, about 30 µm, about 40 µm, about 50 µm, about 60 µm, about 70 µm, about 80 µm, about 90 µm, about 100 µm, about 110 µm, about 120 µm, about 130 µm, and about 140 µm.

In some aspects, the electride described herein has a surface area from about 0.1 to about 2,500 $m^2/g$, including exemplary values of about 1 $m^2/g$, 10, $m^2/g$, 20 $m^2/g$, 30 $m^2/g$, about 50 $m^2/g$, about 70 $m^2/g$, about 100 $m^2/g$, about 150 $m^2/g$, about 200 $m^2/g$, about 250 $m^2/g$, about 300 $m^2/g$, about 350 $m^2/g$, about 400 $m^2/g$, about 450 $m^2/g$, about 500 $m^2/g$, about 550 $m^2/g$, about 600 $m^2/g$, about 650 $m^2/g$, about 700 $m^2/g$, about 750 $m^2/g$, about 800 $m^2/g$, about 850 $m^2/g$, about 900 $m^2/g$, about 950 $m^2/g$, about 1,000 $m^2/g$, about 1,050 $m^2/g$, about 1,100 $m^2/g$, about 1,150 $m^2/g$, about 1,200 $m^2/g$, about 1,250 $m^2/g$, about 1,300 $m^2/g$, about 1,350 $m^2/g$, about 1,400 $m^2/g$, about 1,450 $m^2/g$, about 1,500 $m^2/g$, about 1,600 $m^2/g$, about 1,700 $m^2/g$, about 1,800 $m^2/g$, about 1,900 $m^2/g$, about 2,000 $m^2/g$, about 2,100 $m^2/g$, about 2,200 $m^2/g$, about 2,300 $m^2/g$, and about 2,400 $m^2/g$.

In certain aspects, the inventive electrides described herein have a high electrical conductivity from about 0.1 S/cm to about $1 \times 10^7$ S/cm, including exemplary values of about 1 S/cm, 10 S/cm, 100 S/cm, 500 S/cm, about $1 \times 10^3$ S/cm, about $2 \times 10^3$ S/cm, about $3 \times 10^3$ S/cm, about $4 \times 10^3$ S/cm, about $5 \times 10^3$ S/cm, about $6 \times 10^3$ S/cm, about $7 \times 10^3$ S/cm, about $8 \times 10^3$ S/cm, about $9 \times 10^3$ S/cm, about $1 \times 10^4$ S/cm, about $2 \times 10^4$ S/cm, about $3 \times 10^4$ S/cm, about $4 \times 10^4$ S/cm, about $5 \times 10^4$ S/cm, about $6 \times 10^4$ S/cm, about $7 \times 10^4$ S/cm, about $8 \times 10^4$ S/cm, about $9 \times 10^4$ S/cm, about $1 \times 10^5$ S/cm, about $2 \times 10^5$ S/cm, about $3 \times 10^5$ S/cm, about $4 \times 10^5$ S/cm, about $5 \times 10^5$ S/cm, about $6 \times 10^5$ S/cm, about $7 \times 10^5$ S/cm, about $8 \times 10^5$ S/cm, about $9 \times 10^5$ S/cm, about $1 \times 10^6$ S/cm, about $2 \times 10^6$ S/cm, about $3 \times 10^6$ S/cm, about $4 \times 10^6$ S/cm, about $5 \times 10^6$ S/cm, about $6 \times 10^6$ S/cm, about $7 \times 10^6$ S/cm, about $8 \times 10^6$ S/cm, and about $9 \times 10^6$ S/cm. It is further understood that the electrical conductivity can have any value between any two foregoing values.

In yet other aspects, the inventive electrides exhibit a low work function from about 1.5 to about 4 eV, including exemplary values of about 1.6 eV, about 1.7 eV, about 1.8 eV, about 1.9 eV, about 2.0 eV, about 2.1 eV, about 2.2 eV, about 2.3 eV, about 2.4 eV, about 2.5 eV, about 2.6 eV, about 2.7 eV, about 2.8 eV, about 2.9 eV, about 3.0 eV, about 3.1 eV, about 3.2 eV, about 3.3 eV, about 3.4 eV, about 3.5 eV, about 3.6 eV, about 3.7 eV, about 3.8 eV, and about 3.9 eV.

In still further aspects, the inventive electrides exhibit a sheet resistance from about 1 to about 1,000,000 Ohm/sq, from about 10 to about 1,000,000 Ohm/sq, including exemplary values of about 2 Ohm/sq, about 3 Ohm/sq, about 4 Ohm/sq, about 5 Ohm/sq, about 6 Ohm/sq, about 7 Ohm/sq, about 8 Ohm/sq, about 9 Ohm/sq, about 100 Ohm/sq, about 1,000 Ohm/sq, about 10,000 Ohm/sq, about 100,000 Ohm/sq.

In still further aspects, the electrochemically active structure of the current disclosure is an anode. In further aspects, the electrochemically active structure can be a battery or a portion of thereof. It is again understood that the electrochemically active structure can be any battery depending on the desired application and compatibility of the materials. In certain aspects, the battery is a fluoride shuttle battery. In yet other aspects, the battery is a chloride ion battery.

In still further aspects, the electrochemically active structure can further comprise a cathode. It is understood that the cathode material can be chosen depending on a specific application, a desired cell voltage and a compatibility between the cathode and anode materials. In certain aspects, the cathode can comprise core-shell nanoparticles. In some aspects, the cathode can comprise a $Cu/LaF_3$ core shell cathode. In still further aspects, any cathode materials described in U.S. Patent Application Publication No. 2018/0175382 titled "Composite Electrode materials for Fluoride-Ion Electrochemical Cells" that is incorporated herein in its whole entirety can be present in the disclosed electrochemically active structure.

In still further aspects, the electrochemically active structure described herein can comprise an electrolyte. It is understood that the electrolyte can be any ionic conductor that is compatible with other components of the disclosed electrochemically active structure. In certain aspects, the electrolyte can be in the solid state. In still further aspects, the electrolyte can be in the liquid state. In still other aspects, the electrolyte can comprise a fluoride salt. In certain aspects, any of the electrolytes disclosed in U.S. Patent Application Publication No. 2018/0175382 titled "Composite Electrode materials for Fluoride-Ion Electrochemical Cells" that is incorporated herein in its whole entirety can be present in the disclosed electrochemically active structure.

In certain aspects, electrolytes suitable for the disclosed electrochemical structures can include a fluoride salt and a solvent in which the fluoride salt is at least partially present in a dissolved state. The fluoride salt can be a metal fluoride or a non-metal fluoride. The solvent can be an organic liquid or an ionic liquid, or a mixture of the two. In other embodiments, electrolytes suitable for the disclosed electrochemical structures can include a composite electrolyte containing fluoride salt, a polymer and optionally an organic liquid, an ionic liquid, or a mixture of the two. Electrolytes can include, but are not limited to combinations of fluoride salts and solvents disclosed in U.S. Pat. No. 9,166,249, titled "Fluoride Ion Battery Compositions," the disclosure of which is herein incorporated by reference. Electrolytes can further include, but are not limited to combinations of fluoride salts and solvents disclosed in U.S. Patent Application Publication No. 2017/0062874 titled "Non-Aqueous Fluoride Salts, Solutions, and Their Use," the disclosure of which is herein incorporated by reference.

In some exemplary aspects, the suitable liquid electrolyte salts can comprise complex cations in combination with the fluoride anion. The cation can feature organic groups, such as alkylammmonium, alkylphosphonium or alkylsulfonium species, or can consist of metal-organic or metal-coordination complex motifs, such as metallocenium species. Useful solvents for such liquid electrolyte salts can include non-aqueous solvents (denoted here as "organic") that are capable of dissolving the aforementioned fluoride salts to molar concentrations of 0.01 M and above, preferred concentrations being between 0.1 and 3 M. In some exemplary aspects, such solvents can comprise acetone, acetonitrile, benzonitrile, 4-fluorobenzonitrile, pentafluorobenzonitrile, triethylamine (TEA), diisopropylethylamine, 1,2-dimethoxyethane, ethylene carbonate, propylene carbonate (PC), γ-butyrolactone, dimethyl carbonate, diethyl carbonate (DEC), methyl ethyl carbonate, propyl methyl carbonate, tetrahydrofuran, 2-methyltetrahydrofuran, nitromethane, benzene, toluene, chloroform, dichloromethane, 1,2-dichloroethane, dimethylsulfoxide, sulfolane, N,N-dimethylformamide (DMF), N,N-dimethylacetamide (DMA), carbon disulfide, ethyl acetate, methyl butyrate, n-propyl acetate, methyl propionate, methyl formate, 4-methyl-1,3,-dioxolane, pyridine, methyl isobutyl ketone, methyl ethyl ketone, hexamethylphosphoramide, hexamethylphosphorus triamide, 1 methyl-2-pyrrolidinone, 2-methoxyethyl acetate, trimethyl borate, triethylborate and substituted derivatives thereof, as well as sulfones such as ethylmethylsulfone, trimethylene sulfone, 1-methyltrimethylene sulfone, ethyl-sec-butyl sulfone, ethyl isopropyl sulfone (EIPS), 3,3,3-trifluoropropylmethyl sulfone, 2,2,2-trifluoroethyl sulfone, bis(2,2,2-trifluoroethyl)ether (BTFE), glymes (e.g., diglyme, tetraglyme), 1,2-dimethoxyethane (DME) and mixtures thereof. In certain aspects, room temperature ionic liquid materials, or ionic liquids that remain liquid at temperatures below 200 degrees Celsius (such as those described in "Electrochemical Aspects of Ionic Liquids", E. Ohno ed., Wiley Interscience, New York, 2005), are preferred. In yet other aspects, the electrolytes can comprise ionic liquids that remain liquid at temperatures below 100 degrees Celsius such as 1-methyl,1-propylpiperidinium bis(trifluoromethanesulfonyl)imide (MPPTFSI), butyltrimethylammonium bis(trifluoromethanesulfonyl)imide (BTMATFSI) and 1-butyl, 1-methylpyrrolidinium bis(trifluoromethanesulfonyl)imide (BMPTFSI) and their fluoroalkylphosphate (FAP) anion derivatives (e.g. MPP-FAP) where FAP is a hydrophobic anion such as tris(pentafluroethyl)trifluorophosphate, all of which alone or in combination are useful solvents. It is understood that any electrolytes used in the disclosed electrochemically active cells need to be compatible with the anode and cathode materials.

In certain other aspects, the electrolytes suitable for the disclosed electrochemically active structures can also comprise the compositions disclosed above with the addition of a fluoride-ion complexing species such as an anion receptor, a cation complexing species such as a crown ether, or a combination of both. Suitable anion receptors include species capable of binding fluoride anion such as boron, aluminum, ammonium, H-bond donor or similar groups, including aza ethers and alkyl and aryl boron and boronate complexes such as those described in McBreen et al, J. Power Sources, 2000, 89, 163 and West et al., J. Electrochem. Soc., 154, A929 (2007), and boroxin species such as those described in Nair et al., J. Phys. Chem. A, 113, 5918 (2009), all of which are incorporated by reference herein. In particular tris(hexafluoroisopropyl)borate, tris(pentafluorophenyl)borane and all possible regioisomers of difluorophenyl boroxin (DFB), trifluorophenyl boroxin, bis(trifluoromethyl)phenyl boroxin, trifluoromethyl)phenyl boroxin and fluoro(trifluoromethyl)phenyl boroxin can be used.

It is further understood that the electrochemically active structures described herein can further comprise binders, additives, separators, battery casing or packaging, current collectors, electrical contacts, electronic charge and discharge controllers, and other elements of battery construction known to those skilled in the art. In still further aspects, one of ordinary skill in the art, using all described herein components can create a useful lithium free electrochemical cell operable at temperatures ranging from about −40° C. to 200° C. In aspects where the electrochemically active structure is a battery, the battery can be a primary battery or a secondary battery. In still further aspects, where the battery is a secondary battery from 2 to 100 number of rechargeable cycles can be achieved.

In aspects where the electrochemically active structure is a battery, the battery can have any open circuit voltage depending on a chosen anode, cathode, and electrolyte system. It is understood that the batteries comprising disclosed herein anode, cathode and electrolyte systems can have an open circuit voltage from about 1.0 to about 4.5 Volts, including exemplary values of 1.5 Volts, 2.0 Volts, 2.5 Volts, 3.0 Volts, 3.5 Volts, and 4.0 Volts.

In still further aspects, the batteries comprising disclosed herein anode, cathode, and electrolyte systems can have a theoretical gravimetric density from about 300 Wh/kg to about 2,000 Wh/kg, including exemplary values of about 500 Wh/kg, about 600 Wh/kg, about 700 Wh/kg, about 800 Wh/kg, about 900 Wh/kg, about 1,000 Wh/kg, about 1,100 Wh/kg, about 1,200 Wh/kg, about 1,300 Wh/kg, about 1,400 Wh/kg, about 1,500 Wh/kg, about 1,600 Wh/kg, about 1,700 Wh/kg, about 1,800 Wh/kg, and about 1,900 Wh/kg.

In still further aspects, the batteries comprising disclosed herein anode, cathode and electrolyte systems can have a theoretical volumetric density from about 2,000 Wh/L to about 7,000 Wh/L, including exemplary values of about 2,200 Wh/L, about 2,400 Wh/L, about 2,600 Wh/L, about 2,800 Wh/L, about 3,000 Wh/L, 3,200 Wh/L, about 3,400 Wh/L, about 3,600 Wh/L, about 3,800 Wh/L, about 4,000 Wh/L, 4,200 Wh/L, about 4,400 Wh/L, about 4,600 Wh/L, about 4,800 Wh/L, about 5,000 Wh/L, 5,200 Wh/L, about 5,400 Wh/L, about 5,600 Wh/L, about 5,800 Wh/L, about 6,000 Wh/L, 6,200 Wh/L, about 6,400 Wh/L, about 6,600 Wh/L, and about 6,800 Wh/L.

In still further aspects, disclosed herein is a battery comprising at least one layer comprising a nitride or carbide of one or more of an alkaline earth metal, a transition metal, a lanthanide, or a combination thereof; wherein the electride has a lattice capable of intercalating at least one ion, thereby releasing at least one electron into an external circuit; and wherein a change in lattice volume of the electride upon intercalating the at least one ion is less than about 40%; wherein the battery has an open circuit voltage from about 1.0 to about 4.5 volts and has a theoretical gravimetric density from about 300 to about 2000 Wh/kg.

Figure 11:
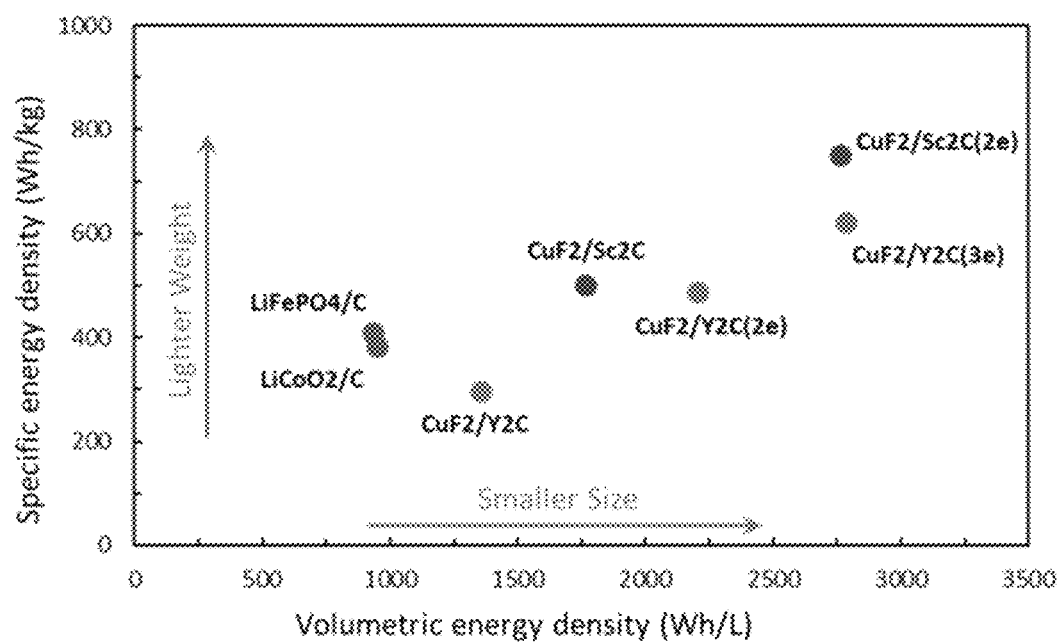
FIG. 11 depicts a comparison of specific energy density and volumetric density between fluoride ion batteries and lithium ion batteries.

Table 4 shows an energy density comparison for various Li-ion and F shuttle batteries. It can be seen that the inventive electrochemically active structure when used as a battery is more efficient is commercially available Li-ion battery. These data is shown in FIG. 11.

TABLE 4

Energy density composition.

| Anode/Cathode System | Gravimetric Energy Density, Wh/kg | Volumetric Energy Density, Wh/L |
|---|---|---|
| C/LiCoO$_2$ | 380 | 953 |
| C/LiFePO$_4$ | 407 | 936 |
| Y$_2$C(3e)/CuF$_2$ | 620 | 2,788 |
| Y$_2$C(2e)/CuF$_2$ | 486 | 2,207 |
| Y$_2$C(1e)/CuF$_2$ | 294 | 1,357 |
| Sc$_2$C(2e)/CuF$_2$ | 748 | 2,768 |
| Sc$_2$C(1e)/CuF$_2$ | 498 | 1,771 |
| Ce/CuF$_2$ | 775 | 5,317 |
| La/CuF$_2$ | 952 | 6,327 |
| Ca/CuF$_2$ | 1,472 | 6,648 |

In still further aspects, the batteries disclosed herein can be suitable for a wide range of primary or rechargeable applications, including but not limited to vehicle traction batteries (electric vehicles (EV), hybrid vehicles (HEV), and plug-in hybrid (PHEV)) or vehicle starter or ignition batteries. The disclosed electrochemically active structures can be useful stationary batteries for emergency power, local energy storage, starter or ignition, remote relay stations, communication base stations, uninterruptible power supplies (UPS), spinning reserve, peak shaving, or load leveling, or other electric grid electric storage or optimization applications. Small format or miniature battery applications including watch batteries, implanted medical device batteries, or sensing and monitoring system batteries (including gas or electric metering) are contemplated, as are other portable applications such as flashlights, toys, power tools, portable radio and television, mobile phones, camcorders, lap-top, tablet or hand-held computers, portable instruments, cordless devices, wireless peripherals, or emergency beacons. Military or extreme environment applications, including use in satellites, munitions, robots, unmanned aerial vehicles, or for military emergency power or communications are also possible.

Fluoride ion battery is a next generation energy storage offering up to 10 times more energy density than currently available lithium ion batteries. During discharge/charge, fluoride anions are shuttling between cathode and anode electrodes instead of cations in lithium ion batteries. Usually, cathode materials are transition metal fluorides and anode materials are alkaline earth or rare earth metals, which is a typical conversion reaction indicating large volume change during discharge/charge. Also disclosed is an insertion-type of anode material for fluoride ion batteries, i.e. transition metal carbides and alkaline metal nitrides, where fluoride ion insertion/extraction occurs during discharge/charge cycling. Benefits of the materials are 1) good electric conductivity (electric conductor or semiconductor); 2) small volume change (<40%) during discharge/charge cycling; 3) lower overpotentials; 4) providing high gravimetric capacity >300 mAh/g (light weight). The following shows its reaction mechanism:

Half cell reaction:

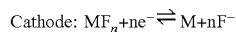

Cathode: $MF_n + ne^- \rightleftharpoons M + nF^-$

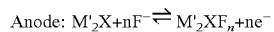

Anode: $M'_2X + nF^- \rightleftharpoons M'_2XF_n + ne^-$

Full cell reaction:

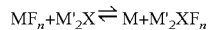

$MF_n + M'_2X \rightleftharpoons M + M'_2XF_n$ where M and M' represent metals, n is electron transfer numbers and X stands for carbon (C) or nitrogen (N).

METHODS

Disclosed herein are also methods for making disclosed electrochemically active structures. In certain aspects, disclosed a method comprising: a) contacting a compound represented by a formula A$_2$N, wherein A comprises Ca, Sr, Ba, Mg, Y, Sc, Gd, or a combination thereof with a solvent that does not substantially react with the compound for a period of time of at least 48 hours; and b) exfoliating a crystalline electride comprising at least one layer comprising at least one metal sub-nitride represented by a formula A$_2$N, wherein A comprises Ca, Sr, Ba, Mg, Y, Sc, Gd, or a combination thereof and one or more layers of anionic electrons; wherein the exfoliated crystalline electride has a lattice capable of intercalating at least one ion, thereby releasing at least one electron into an external circuit; and wherein a change in lattice volume of the electrode upon intercalation is less than about 40%.

In yet other aspects, disclosed a method comprising: a) reacting a metal represented by a formula A, wherein A comprises Ca, Sr, Ba, Mg, Y, Sc, Gd, or a combination thereof with a carbon under conditions effective to form a compound represented by a formula A$_2$C; and b) size reducing the compound represented by a formula A$_2$C, wherein A comprises Ca, Sr, Ba, Mg, Y, Sc, Gd, or a combination thereof, to form a crystalline carbide electride, wherein the carbide crystalline electride has a lattice capable of intercalating at least one ion, thereby releasing at least one electron into an external circuit; and wherein a change in lattice volume of the electrode upon intercalation is less than about 40%.

In some aspects, the compound represented by a formula A$_2$N, wherein A comprises Ca, Sr, Ba, Mg, Y, Sc, Gd, or a combination thereof can be contacted with a solvent to determine the solvent reactivity towards the compound. In other aspects, the solvents used for the exfoliation can be any solvents disclosed herein. In certain aspects, the solvents can be any solvents known in the art. It is understood that to peel apart layers of a van der Waals crystal, only van der Waals interactions have to be overcome; however, to exfoliate a layered electride, electrostatic interactions also have to be overcome. The methods of current invention disclose exfoliation of the inventive electrides.

In certain aspects, the solvents can comprise 1,3-dioxolane, dimethyl carbonate, dimethoxy ethane, toluene, hexane, benzene, benzyl benzoate, N-Methyl-2-pyrrolidone, ethylene carbonate, propylene carbonate, ionic liquids, 1-Octyl-2-pyrollidone, N-Vinyl-pyrrolidone, 1,3-Dimethyl-2-imidazolidinone, N-Dodecyl-2-pyrrolidone, ethyl acetate, benzyl ether, dimethyl sulfoxide, chlorobenzene, dichlorobenzene, 1,2,4-trichlorobenzene, cyclohexanone, benzaldehyde, triethylamine, diethyl ether, tetrahydrofuran, 1,4-dioxane, dimethylformamide; dichloromethane, acetonitrile, chloroform, acetone, N-methylformamide.

In yet other aspects, the solvent comprises 1,3-dioxalane, dimethyl carbonate, dimethoxyethane, benzene, N-methyl-2-pyrrolidone, hexane, ethylene carbonate, propylene carbonate, ionic liquids, or a combination thereof. In yet other aspects, the solvent does not comprise benzyl benzoate, N-Methyl-2-pyrrolidone, 1-Octyl-2-pyrollidone, N-Vinyl-pyrrolidone, 1,3-Dimethyl-2-imidazolidinone, N-Dodecyl- 2-pyrrolidone, ethyl acetate, benzyl ether, dimethyl sulfoxide, chlorobenzene, dichlorobenzene, 1,2,4-trichlorobenzene, cyclohexanone, benzaldehyde, triethylamine, diethyl ether, tetrahydrofuran, 1,4-dioxane, dimethylformamide; dichloromethane, acetonitrile, chloroform, acetone, N-methylformamide. In still further aspects, the solvent comprises 1,3-dioxalane, dimethyl carbonate, dimethoxyethane. In yet other aspects, the solvent comprises ethylene carbonate, propylene carbonate, or a combination thereof. In still further aspects, the solvent can comprise ionic liquids. In yet other aspects, the solvent does not comprise 1,4-dioxane or tetrahydrofuran.

In certain aspects, the liquid exfoliation can be assisted by mechanical agitation such as sonication, shearing, or ball milling.

In other aspects, the contact with the solvent and the liquid exfoliation is done under inert atmosphere. In yet other aspects, the contact with the solvent and the liquid exfoliation is done under anhydrous and oxygen-free conditions. In yet other aspects, the compound represented by a formula $A_2N$ and the solvent can be sonicated. In certain aspects, the sonication is done for about 5 min to about 600 min, including exemplary values of about 10 min, about 20 min, about 30 min, about 40 min, about 50 min, about 60 min, about 70 min, about 80 min, about 90 min, about 100 min, about 120 min, about 140 min, about 160 min, about 180 min, about 200 min, about 220 min, about 240 min, about 260 min, about 280 min, about 300 min, about 320 min, about 340 min, about 360 min, about 380 min, about 400 min, about 420 min, about 440 min, about 460 min, about 480 min, about 500 min, about 520 min, about 540 min, about 560 min, and about 580 min. In still further aspects the sonication can be performed up to about 100 hours, but it is not limited to thereto. In yet other aspects, the sonication can be done in a water sonicator. In still further aspects, the ultrasonication can be utilized.

In certain aspects, an additive such as a surfactant may be added to the solvent in order to facilitate the exfoliation and limit (and/or prevent) the exfoliated nanosheets from being agglomerated. In some exemplary aspects, the surfactants can include, but are not limited to, sodium dodecyl sulfate (SDS) and sodium dodecyl benzenesulfonate (SDBS).

In still further aspects, the concentration of compound represented by a formula $A_2N$ in the solvent can be greater than or equal to about 0.001 g/ml, for example, within a range from about 0.001 g/ml to about 10 g/ml, but is not limited thereto. In still further aspects, the concentration of compound represented by a formula $A_2N$ in the solvent can be greater than or equal to about 0.01 g/ml, about 0.05 f/ml, 0.01 g/ml, about 0.05 g/ml, about 0.1 g/ml, about 0.5 g/ml, about 1 g/ml, about 2 g/ml, about 3 g/ml, about 4 g/ml, about 5 g/ml, about 6 g/ml, about 7 g/ml, about 8 g/ml, about 9 g/ml, or about 10 g/ml.

In yet other aspects, the methods disclosed herein comprise a step of separating the crystalline electride form the solvent. The separation step can comprise any steps known in the art. In some exemplary aspects, the separation comprises decantation, or evaporation.

In still further aspects and as described herein, the compounds represented by a formula $A_2C$, wherein A comprises Ca, Sr, Ba, Mg, Y, Sc, Gd, or a combination thereof can be formed by contacting a metal A with a carbon under conditions effective to form the compound $A_2C$. In certain aspects, the conditions effective to form the compound $A_2C$ comprise an arc melting or direct heating in a furnace. In still further aspects, the conditions effective to form the compound $A_2C$ comprise a temperature from about 500° C. to about 3,000° C., including exemplary values of about 800° C. about 3,000° C., about 1,300° C., about 1,400° C., about 1,500° C., and about 1,600° C. In still further aspects, the conditions effective to form the compound $A_2C$ comprise a presence of an inert atmosphere. In still further aspects, the conditions effective to form the compound $A_2C$ comprise a pressure from about 1 to about 760 mmHg. Vacuum is applied for some compounds prior to arc melting but not during arc melting. For the synthesis in a furnace, the compounds are often sealed in a quartz ampoule under reduced pressure ($10^{-3}$ mmHg) although the pressure often does rise in the sealed ampoule during synthesis to pressures as high as 3500 mmHg. In certain aspects, the inert atmosphere comprises an argon or nitrogen gas. In certain aspects, the ratio of metal A and carbon is at least 1:1, at least 2:1, is at least 3:1, at least 4:1, or at least 5:1. It is understood that the $A_2C$ compounds can have any shape. In some the compound can have a shape of a pellet. In still other aspects, the compound can have a shape of a tablet. In yet other aspects, the compound can have a shape of a ball. In still further aspects, the compound can have an irregular form. It is understood that in some exemplary aspects where the compound is formed by an arc melting, the formed compound can be remelted using any known in the art techniques. In aspects where the compound is remelted, the step of remelting can be repeated any number of times to ensure high purity and homogeneity of the compound. In certain aspects, the compound can be remelted at least two times, at least three times, at least four times, at least five time, or at least ten times.

In still further aspects, the size reducing step of making the compound $A_2C$ can comprise any steps known in the art. In certain aspects, the size reducing step comprises a step of hydrogen brittling. In certain aspects, to achieve size reduction by hydrogen brittling, the compounds is exposed to a gas comprising hydrogen. In some aspects, gas can comprises from greater than 0 volume % of hydrogen to 100 volume % of hydrogen, including exemplary values of about 0.1 volume %, about 0.5 volume %, about 1 volume %, about 5 volume %, about 10 volume %, about 15 volume %, about 20 volume %, about 25 volume %, about 30 volume %, about 35 volume %, about 40 volume %, about 45 volume %, about 50 volume %, about 55 volume %, about 60 volume %, about 65 volume %, about 70 volume %, about 75 volume %, about 80 volume %, about 85 volume %, about 90 volume %, about 95 volume %, and about 99 volume %. In other aspects, gas can comprises from greater than 0 wt % of hydrogen to 100 wt % of hydrogen, including exemplary values of about 0.1 wt %, about 0.5 wt %, about 1 wt %, about 5 wt %, about 10 wt %, about 15 wt %, about 20 wt %, about 25 wt %, about 30 wt %, about 35 wt %, about 40 wt %, about 45 wt %, about 50 wt %, about 55 wt %, about 60 wt %, about 65 wt %, about 70 wt %, about 75 wt %, about 80 wt %, about 85 wt %, about 90 wt %, about 95 wt %, and about 99 wt %. In yet other aspects, the gas can further comprise nitrogen, argon, or a combination thereof. In still further aspects, the gas is a jet stream gas. In yet other aspects, the compound is exposed to the gas from about 5 min to about 60 min, including exemplary values of about 10 min, about 15 min, about 20 min, about 25 min, about 30 min, about 35 min, about 40 min, about 45 min, about 50 min, an about 55 min.

In still further aspects, the hydrogen brittling step can be done at any temperature that allows achieving a desired size of the particles. In some aspects, the hydrogen brittling is performed at a temperature from about 20° C. to about 1,000° C., including exemplary values of about 25° C., about 30° C., about 50° C., about 100° C., about 150° C., about 200° C., about 250° C., about 300° C., about 350° C., about 450° C., about 400° C., about 500° C., about 550° C., about 600° C., about 650° C., about 700° C., about 750° C., about 800° C., about 850° C., about 900° C., and about 950° C.

In still further aspects, the step of size reducing further comprises annealing. In certain aspects, the annealing is performed under dynamic vacuum. In yet other aspects, the annealing is performed under dynamic vacuum at a temperature from about 200° C. to about 1,000° C., including exemplary values of about 250° C., about 300° C., about 350° C., about 450° C., about 400° C., about 500° C., about 550° C., about 600° C., about 650° C., about 700° C., about 750° C., about 800° C., about 850° C., about 900° C., and about 950° C. In still further aspects, the annealing is performed under dynamic vacuum at a pressure from about 1 mmHg to about $10^{-3}$ mm Hg. In yet other aspects, the compound is annealed from about 1 hr. to about 2 weeks, including exemplary values of about 4 days.

In still further aspects, the size-reducing step further comprises a grinding step after the compound is embrittled by exposure to the gas. In certain aspects, the grinding step can be done under any conditions that allows achieving a desired size and purity of the compound. In still further aspects, the compound is size-reduced to a particle size from about 100 nm to about 150 μm, including exemplary values of about 200 nm, about 300 nm, about 400 nm, about 500 nm, about 600 nm, about 700 nm, about 800 nm, about 900 nm, about 1 μm, about 2 μm, about 3 μm, about 4 μm, about 5 μm, about 6 μm, about 7 μm, about 8 μm, about 9 μm, about 10 μm, about 20 μm, about 30 μm, about 40 μm, about 50 μm, about 60 μm, about 70 μm, about 80 μm, about 90 μm, about 100 μm, about 110 μm, about 120 μm, about 130 μm, and about 140 μm.

In yet other aspects, the size reducing step can further comprise ball milling. In some aspects, the ball milling is performed in oxygen free atmosphere. In yet other aspects, the ball milling is performed in an inert atmosphere. In such aspects, the inert atmosphere comprises an argon, nitrogen, or a combination thereof. In still further aspects, the ball milling is from about 5 min to about 100 hours, including exemplary values of about 15 min, about 30 min, about 1 hour, about 2 hour, about 3 hours, about 4 hours, about 5 hours, about 6 hours, about 7 hours, about 8 hours, about 9 hours, about 25 hours, about 50 hours, and about 75 hours. It is understood that the ball milling can be performed for any time between any two foregoing values. For example, the ball milling can be performed from about 2 hours to about 100 hours, or from about 2 hours to about 50 hours.

In still further aspects, after ball-milling, the compound is size-reduced to a particle size from about 100 nm to about 150 μm, including exemplary values of about 200 nm, about 300 nm, about 400 nm, about 500 nm, about 600 nm, about 700 nm, about 800 nm, about 900 nm, about 1 μm, about 2 μm, about 3 μm, about 4 μm, about 5 μm, about 6 μm, about 7 μm, about 8 μm, about 9 μm, about 10 μm, about 20 μm, about 30 μm, about 40 μm, about 50 μm, about 60 μm, about 70 μm, about 80 μm, about 90 μm, about 100 μm, about 110 μm, about 120 μm, about 130 μm, and about 140 μm.

It is understood that after the size-reducing step, the particles can have any particle size distribution. The value of $D_{(n)}$ thus represents the particle size of which (n) percentage of the mass is finer than. For example, the quantity $D_{(100)}$ represents the particle size of which 100% of a mass is finer than. The quantity $D_{(75)}$ represents the particle size of which 75% of a mass is finer than. The quantity $D_{(50)}$ is the median particle size of a mass for which 50% of the mass is finer than. The quantity $D_{(25)}$ represents the particle size of which 25% of a mass is finer than. The quantity $D_{(10)}$ represents the particle size of which 10% of a mass is finer than. In exemplary and non-limiting aspects, after the size reducing step, the value of $D_{(100)}$ can be less than 200 μm, less than 150 μm, less than 100 μm, less than 75 μm, less than 50 μm, less than 25 μm, less than 10 μm, or less than 1 μm. For example, the value of $D_{(100)}$ can be less than 100 μm. Still further, $D_{(100)}$ can be a value within a range of any two $D_{(100)}$ values provided above.

In one aspect, exemplary values for $D_{(75)}$ can be less than 200 μm, less than 150 μm, less than 100 μm, less than 75 μm, less than 50 μm, less than 25 μm, less than 10 μm, or less than 1 μm. For example, the value of $D_{(75)}$ can be less than 10 μm. Still further, $D_{(75)}$ can be a value within a range of any two $D_{(75)}$ values provided above.

In one aspect, exemplary values for $D_{(50)}$ can be less than 200 μm, less than 150 μm, less than 100 μm, less than 75 μm, less than 50 μm, less than 25 μm, less than 10 μm, or less than 1 μm. For example, the value of $D_{(50)}$ can be less than 5 μm. Still further, $D_{(50)}$ can be a value within a range of any two $D_{(50)}$ values provided above. In one aspect, the particle size distribution characterized by a $D_{(100)}$ less than 200 μm and $D_{(50)}$ less than about less than 75 μm, less than 50 μm, less than 25 μm, less than 10 μm, or less than 1 μm. In a further aspect, the composition has a particle size distribution characterized by a median particle size $D_{(50)}$ in the range from about less than 75 μm, less than 50 μm, less than 25 μm, less than 10 μm, or less than 1 μm. In one aspect, the particle size distribution characterized by a $D_{(100)}$ less than 20 μm and $D_{(50)}$ less than about 5 μm micron. In a further aspect, the composition has a particle size distribution characterized by a median particle size $D_{(50)}$ in the range from about 1 μm to 10 μm.

Exemplary values for $D_{(25)}$ can be less than 200 μm, less than 150 μm, less than 100 μm, less than 75 μm, less than 50 μm, less than 25 μm, less than 10 μm, or less than 1 μm. Alternatively, exemplary values for $D_{(25)}$ can also be greater than 100 μm, greater than 75 μm, greater than 50 μm, greater than 25 μm, greater than 10 μm, or greater than 1 μm. For example, the value of $D_{(25)}$ can be less than 5 μm. For example, the value of $D_{(25)}$ can be from about 5 nm to about 5 μm. Still further, $D_{(25)}$ can be a value within a range of any two $D_{(25)}$ values provided above.

In still further aspects, the size-reducing step does not alter a chemical structure and composition of the disclosed compounds.

In still further aspects, disclosed herein, is a method of making a battery comprising: providing an anode comprising a crystalline electride comprising at least one layer comprising at least one metal nitride or carbide represented by a formula $A_2B$, wherein A comprises an alkaline earth metal, a transition metals, a lanthanide, or a combination thereof; and wherein B is a nitrogen or a carbon, wherein the electride has a lattice capable of intercalating at least one ion, thereby releasing at least one electron into an external circuit; and wherein a change in lattice volume of the electride upon intercalation is less than about 40%; providing a cathode; and providing an electrolyte; wherein the battery has an open circuit voltage from about 1.0 volts to about 4.5 volts and has a theoretical gravimetric density from about 300 to about 2000 Wh/kg.

It is understood that the method of making a battery can comprise any anode material described herein. It is further understood that any crystalline electride materials described herein can be utilized. In other aspects, the method of making a battery can comprise any cathode material described herein. In still further aspects, the method of making a battery can comprise any electrolyte described herein.

It is understood that the batteries prepared by the disclosed method and comprising disclosed herein anode, cathode and electrolyte systems can have an open circuit voltage from about 1.0 volts to about 4.5 Volts, including exemplary values of 1.5 Volts, 2.0 Volts, 2.5 Volts, 3.0 Volts, 3.5 Volts, and 4.0 Volts. In the aspects, where the battery is secondary battery, the open circuit voltage of the battery does not substantially changes for at least 10 number of charge/discharge cycles.

In still further aspects, the batteries prepared by the disclosed method and comprising disclosed herein anode, cathode and electrolyte systems can have a theoretical gravimetric density from about 400 Wh/kg to about 2,000 Wh/kg, including exemplary values of about 500 Wh/kg, about 600 Wh/kg, about 700 Wh/kg, about 800 Wh/kg, about 900 Wh/kg, about 1,000 Wh/kg, about 1,100 Wh/kg, about 1,200 Wh/kg, about 1,300 Wh/kg, about 1,400 Wh/kg, about 1,500 Wh/kg, about 1,600 Wh/kg, about 1,700 Wh/kg, about 1,800 Wh/kg, and about 1,900 Wh/kg.

In still further aspects, the batteries prepared by the disclosed method and comprising disclosed herein anode, cathode and electrolyte systems can have a theoretical volumetric density from about 2,000 Wh/L to about 7,000 Wh/L, including exemplary values of about 2,200 Wh/L, about 2,400 Wh/L, about 2,600 Wh/L, about 2,800 Wh/L, about 3,000 Wh/L, about 3,200 Wh/L, about 3,400 Wh/L, about 3,600 Wh/L, about 3,800 Wh/L, about 4,000 Wh/L, 4,200 Wh/L, about 4,400 Wh/L, about 4,600 Wh/L, about 4,800 Wh/L, about 5,000 Wh/L, 5,200 Wh/L, about 5,400 Wh/L, about 5,600 Wh/L, about 5,800 Wh/L, about 6,000 Wh/L, 6,200 Wh/L, about 6,400 Wh/L, about 6,600 Wh/L, and about 6,800 Wh/L.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Example 1

Figure 12A:
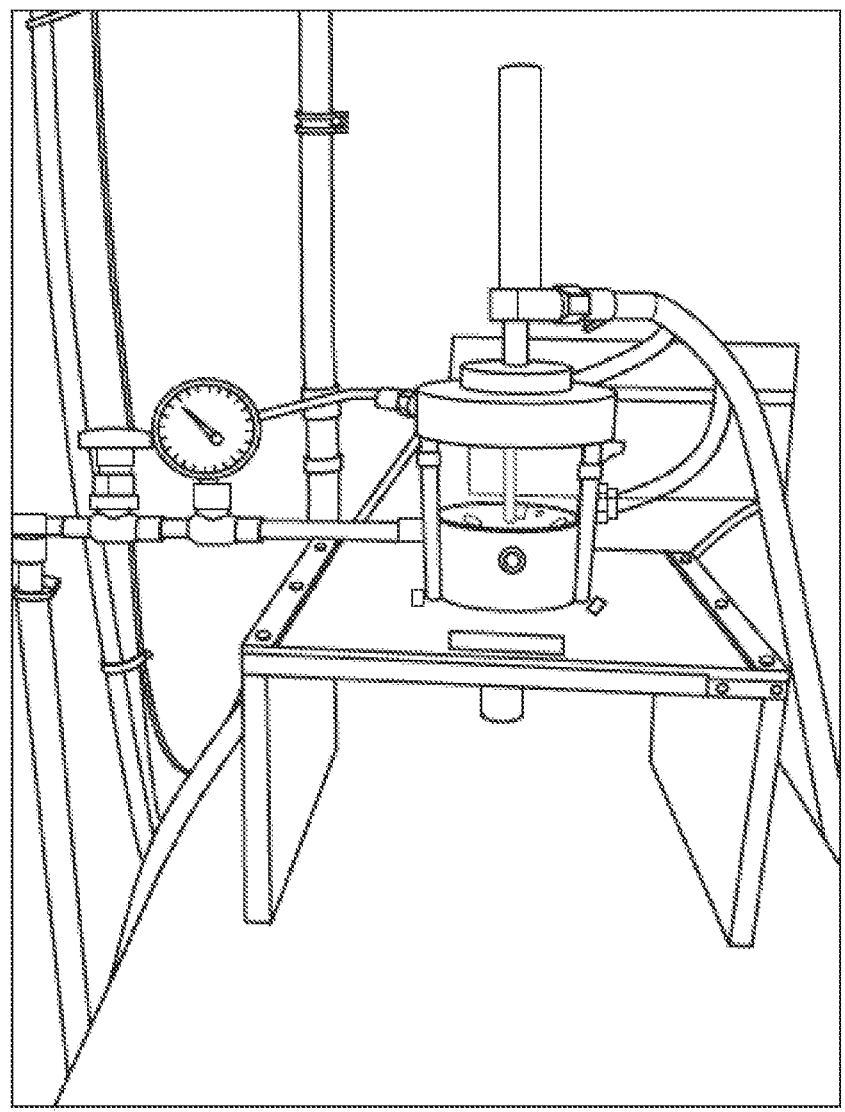
FIG. 12A-12C depict photographs of equipment (FIGS. 12A and 12B) used to synthesize $Y_2C$ pellets (FIG. 12C).
Figure 12B:
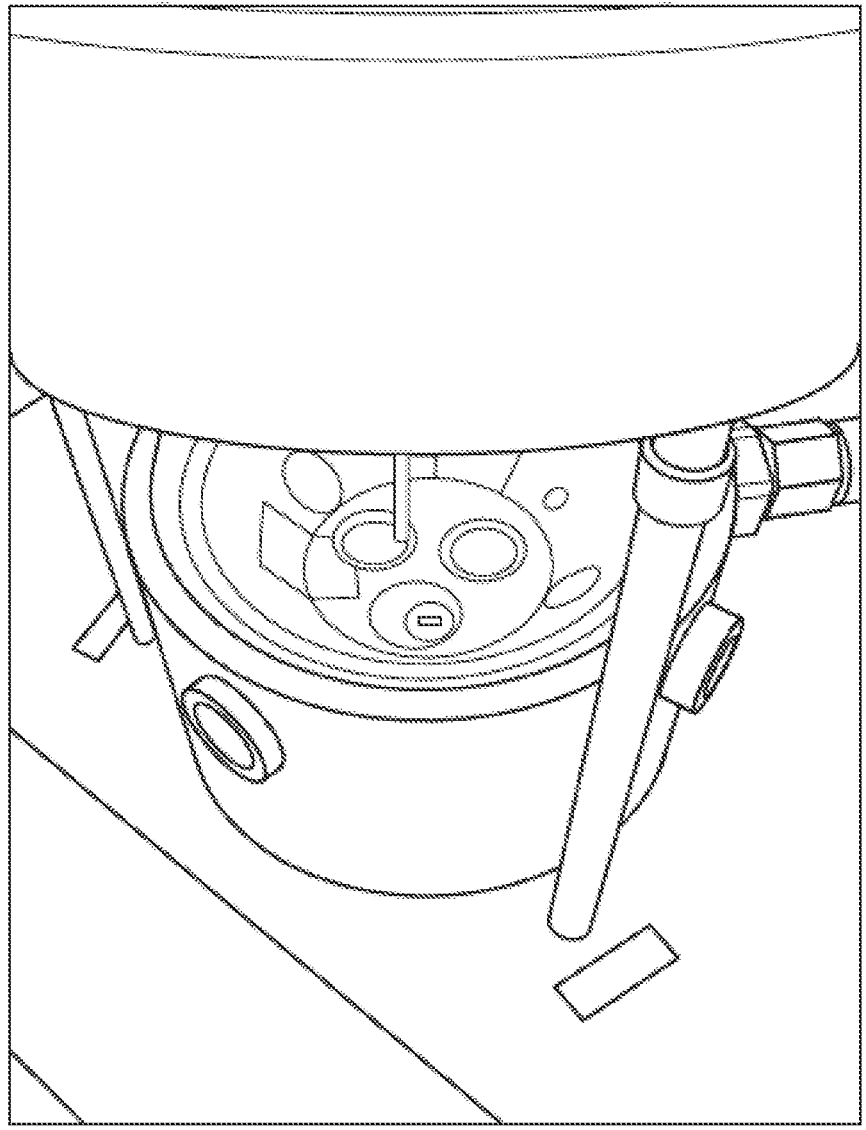
Figure 12C:
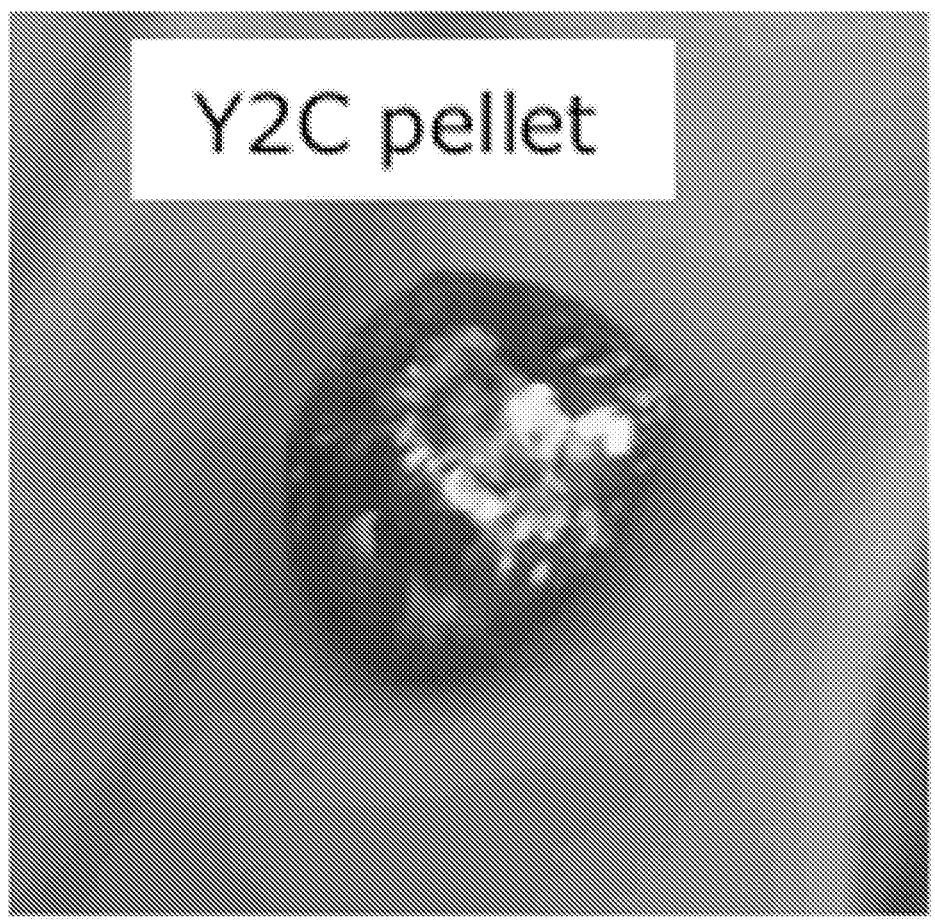

The exemplary crystalline electride $Y_2C$ has been prepared by an arc melting. FIG. 12 shows photographs of equipment (FIG. 12A-12B) used to form $Y_2C$ pellets (FIG. 12C). This synthesized $Y_2C$ has been sized-reduced by hydrogen-brittling and annealed under dynamic vacuum at 350° C. at conditions as shown in the equations (4-5):

$$Y_2C \xrightarrow{5\% H_2, 95\% N_2 \text{ at } 25° C.} Y_2CH_x \quad (4)$$

$$Y_2C \xrightarrow{H_2 \text{ at } 25° C.} Y_2CH_x \quad (5)$$

Hydrogen brittling is performed at 350 C for 2 hours. Then, the sample is milled. Then it is heated under dynamic vacuum at 600-900 C for 2 hours.

The embrittled $Y_2C$ has been further grinded under dynamic vacuum as shown in the equation (6):

$$Y_2CH_x \xrightarrow{800° C.} Y_2C. \quad (6)$$

Figure 13:
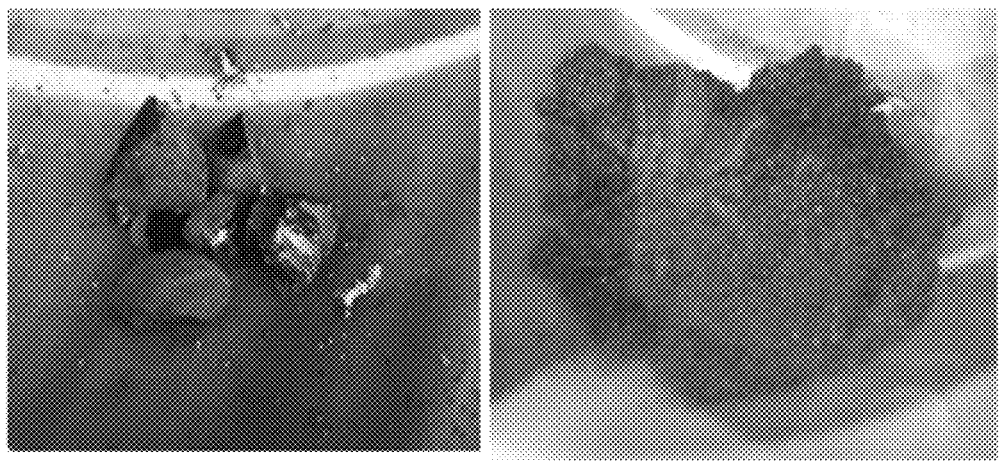
FIG. 13 depicts photographs of $Y_2C$ size-reduced by hydrogen-brittling.
Figure 14:
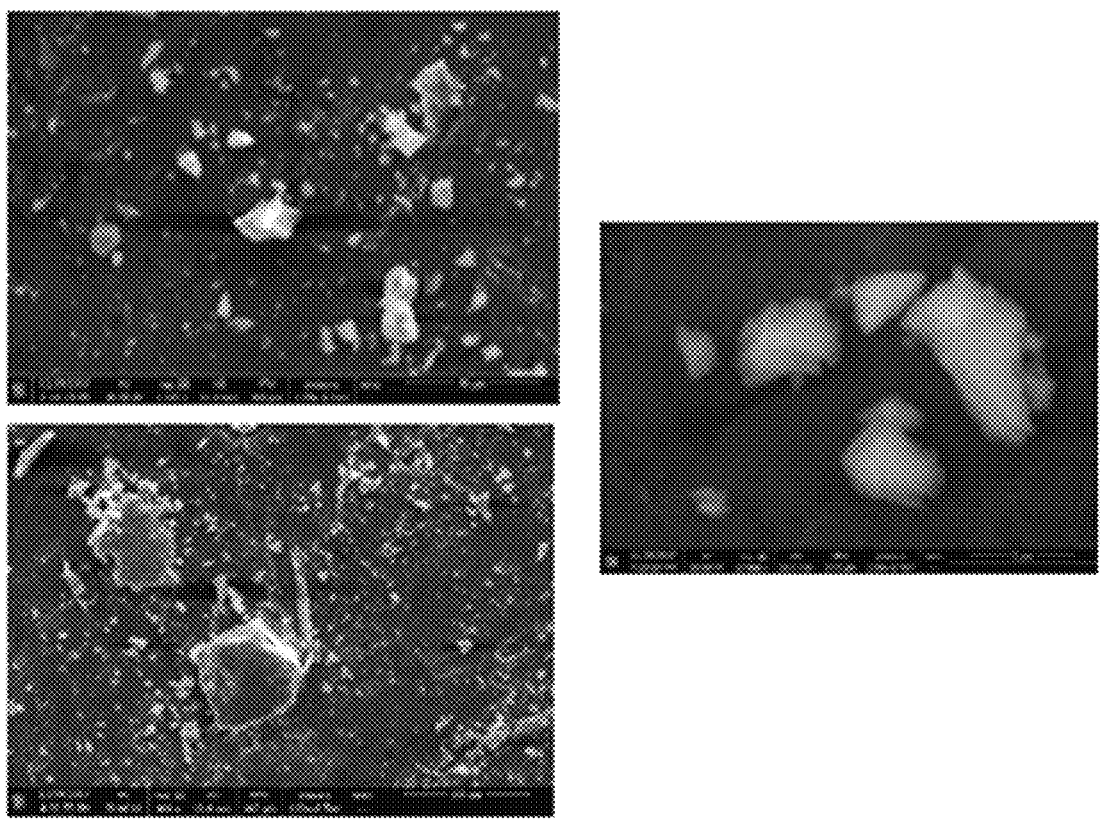
FIG. 14 depicts SEM (Scanning Electron Microscopy) images of $Y_2C$ particles obtained by hydrogen brittling.

FIG. 13 shows photographs of the embrittled and grinded $Y_2C$. The SEM images of the grinded $Y_2C$ are shown in FIG. 14, which shows that the particle size is non-uniform and ranges about 1-4 μm to 10-20 μm and up to 100 μm.

Figure 15:
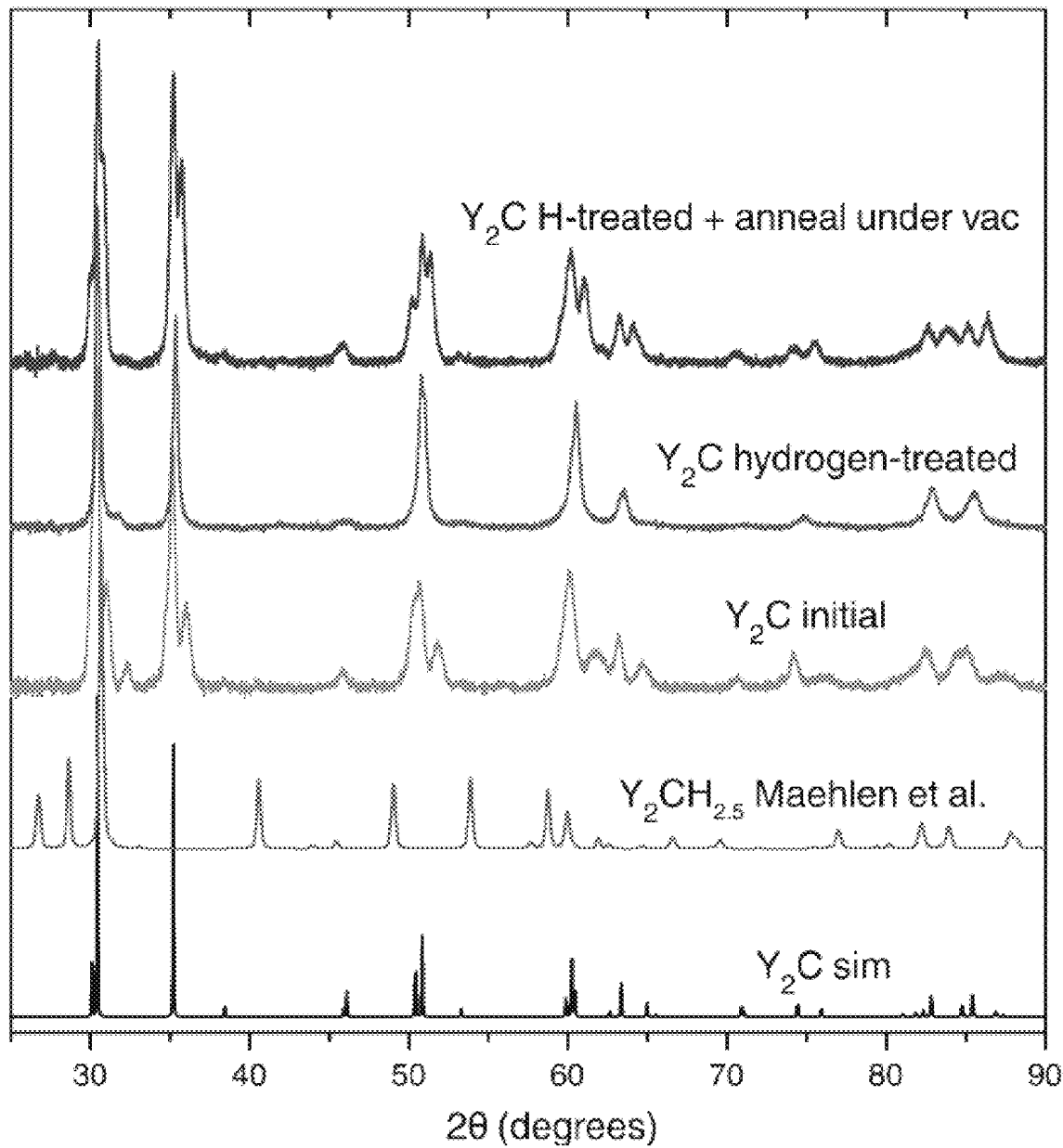
FIG. 15 depicts XRD (X-Ray Powder Diffraction) images of $Y_2C$ particles obtained by hydrogen brittling.

To evaluate the chemical structure of $Y_2C$ as synthesized, after treatment with hydrogen, and after hydrogen treatment and after annealing, X-ray Powder Diffraction Analysis (XRD) was utilized. FIG. 15 shows an XRD images of a simulated $Y_2C$ structure, a $Y_2CH$ obtained and described by Mehlen et al., a synthesized $Y_2C$, a hydrogen-treated $Y_2C$, and a hydrogen treated and then annealed $Y_2C$.

Example 2

As described herein ball milling is done in place of hydrogen embrittlement.

Figure 16A:
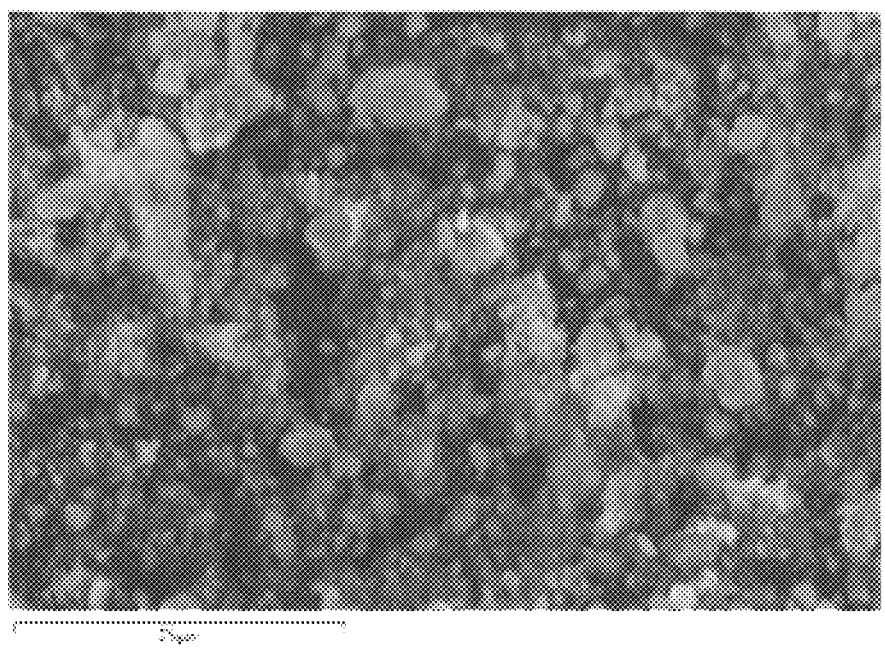
FIG. 16A depicts SEM (Scanning Electron Microscopy) images of $Y_2C$ particles obtained by ball milling a) after 2 hours.
Figure 16B:
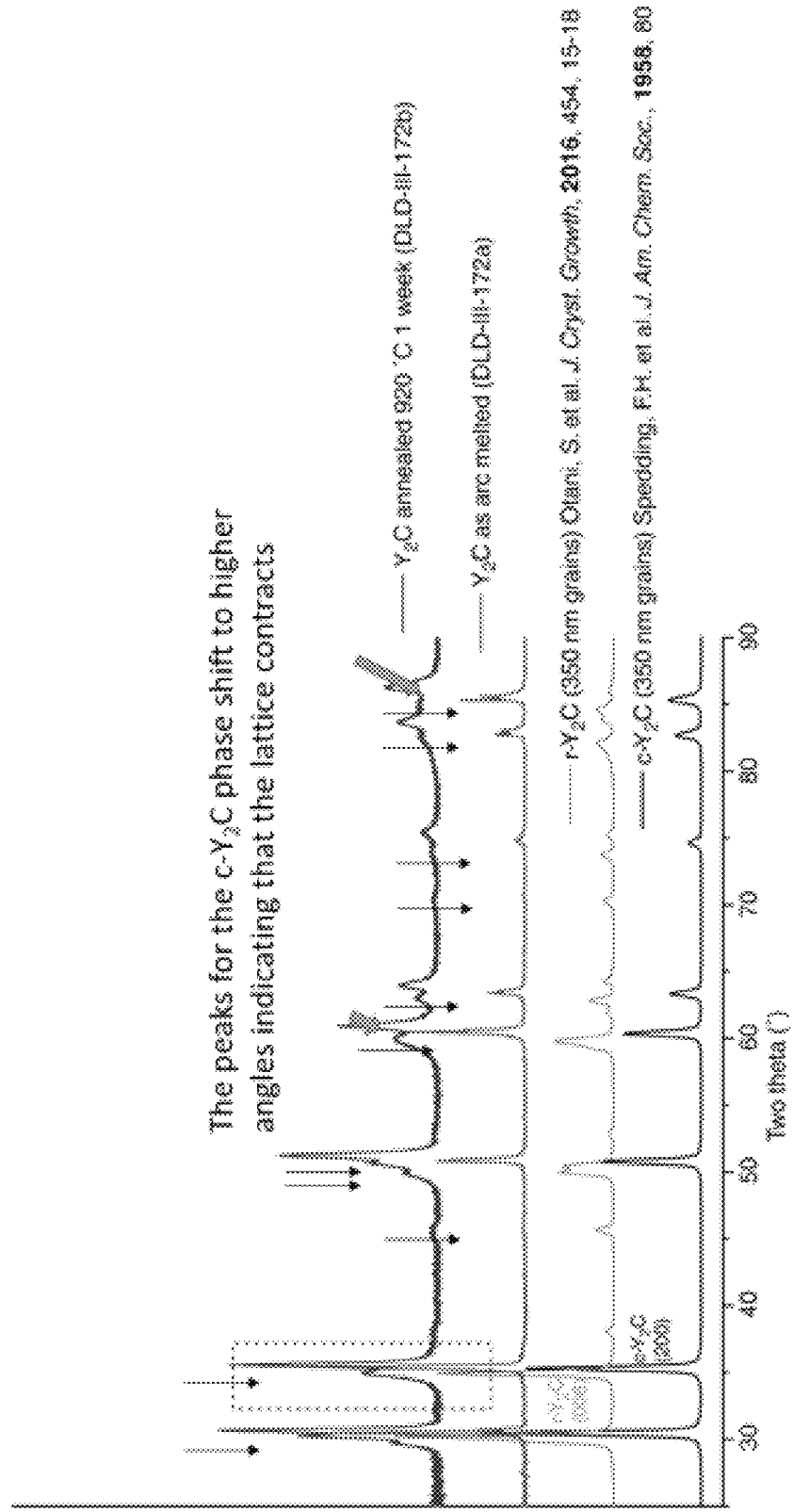
FIG. 16B depicts its XRD patterns and FIG. 16C depicts X-ray photoelectron spectroscopy (XPS), consisting of 40% layered structure (r-$Y_2C$) and 60% cubic structure (c-$Y_2C$)
Figure 16C:
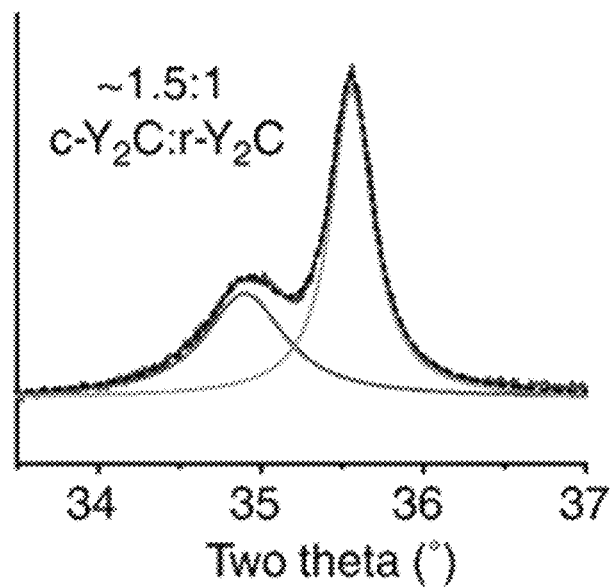
Figure 17A:
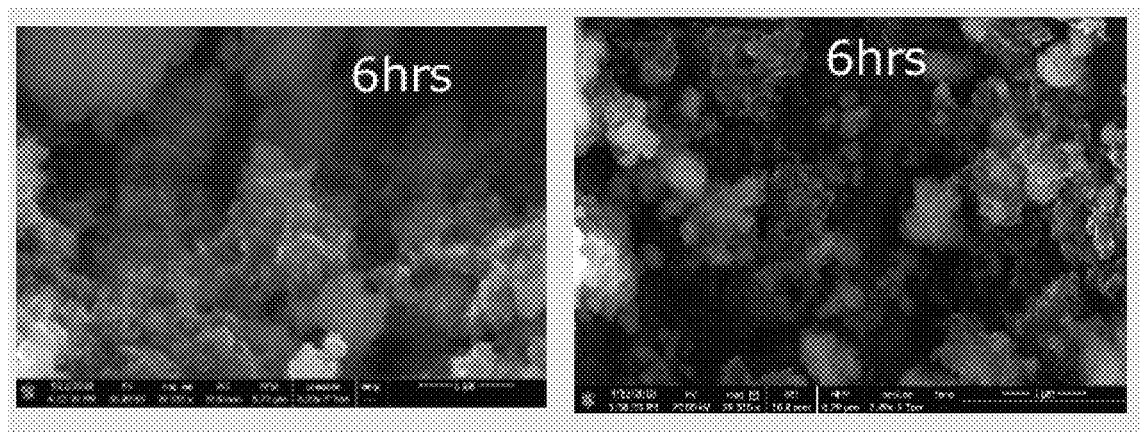
FIG. 17A depicts SEM images of $Y_2C$ particles obtained by ball milling a) after 6 hours.
Figure 17B:
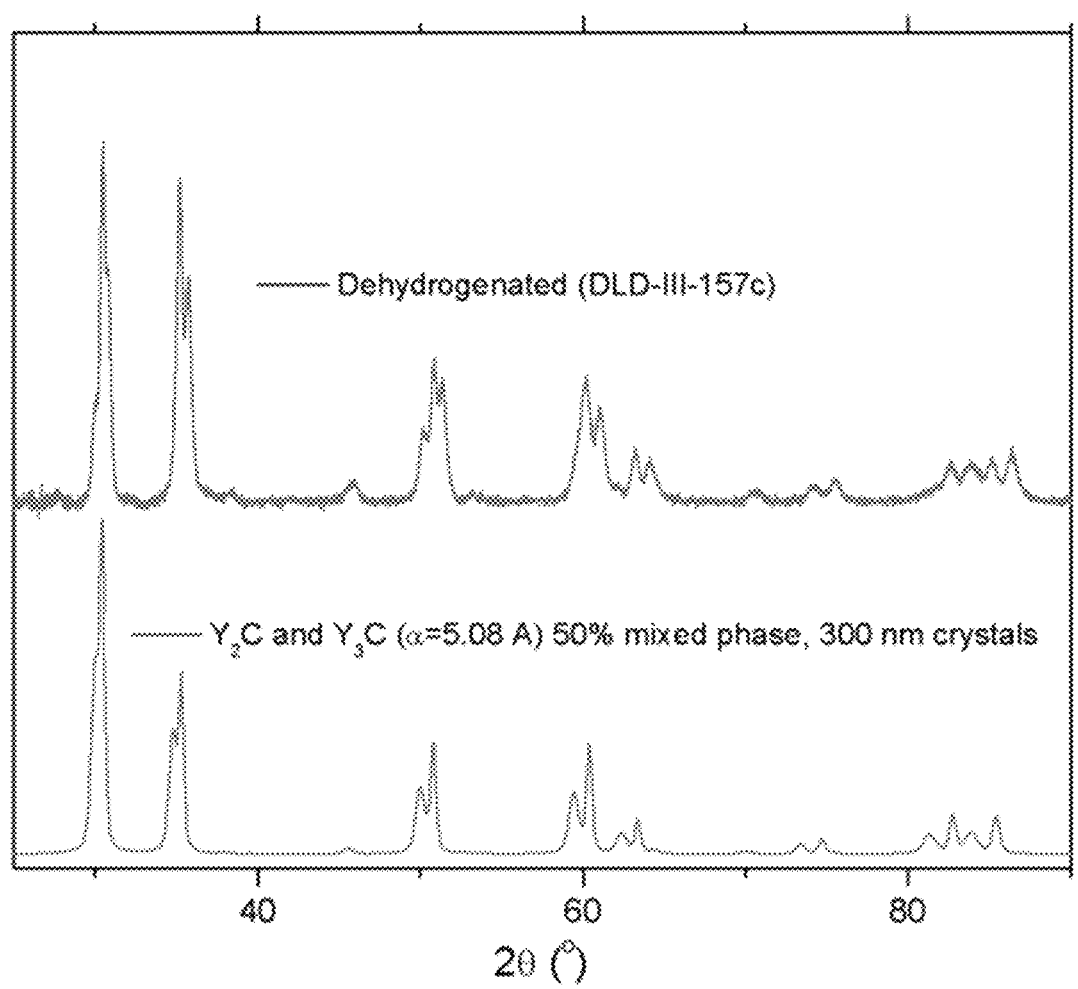
FIG. 17B depicts its XRD pattern and FIG. 17C depicts the XPS, consisting of 60% r-$Y_2C$ and 40% c-$Y_2C$.
Figure 17C:
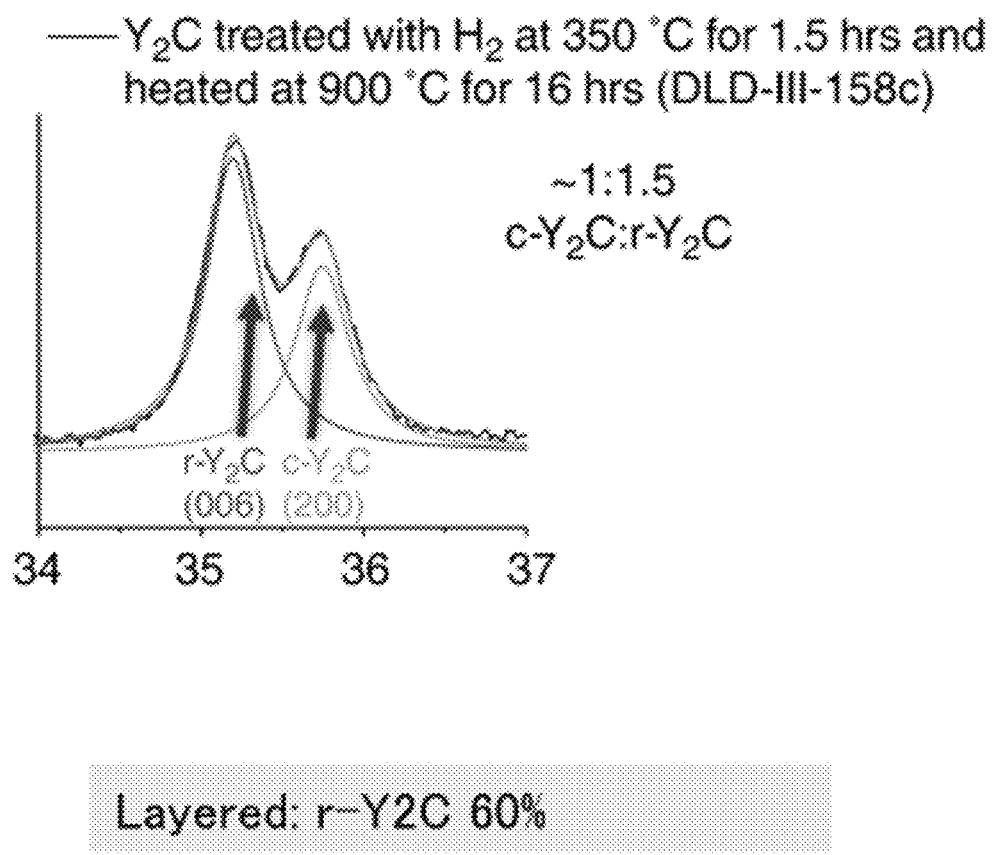

Synthesized $Y_2C$ was further ball milled for 2 and 6 hours. FIG. 16 shows SEM images of particles obtained by ball milling after 2 hours (FIG. 16A) and after 6 hours (FIGS. 16B and 16C). After 2 hours of ball milling, the resulted particle size is non-uniform and particles less than 10 μm are obtained. The ball milling for 6 hours results in the particles size of about 200 nm.

Example 3

Figure 18:
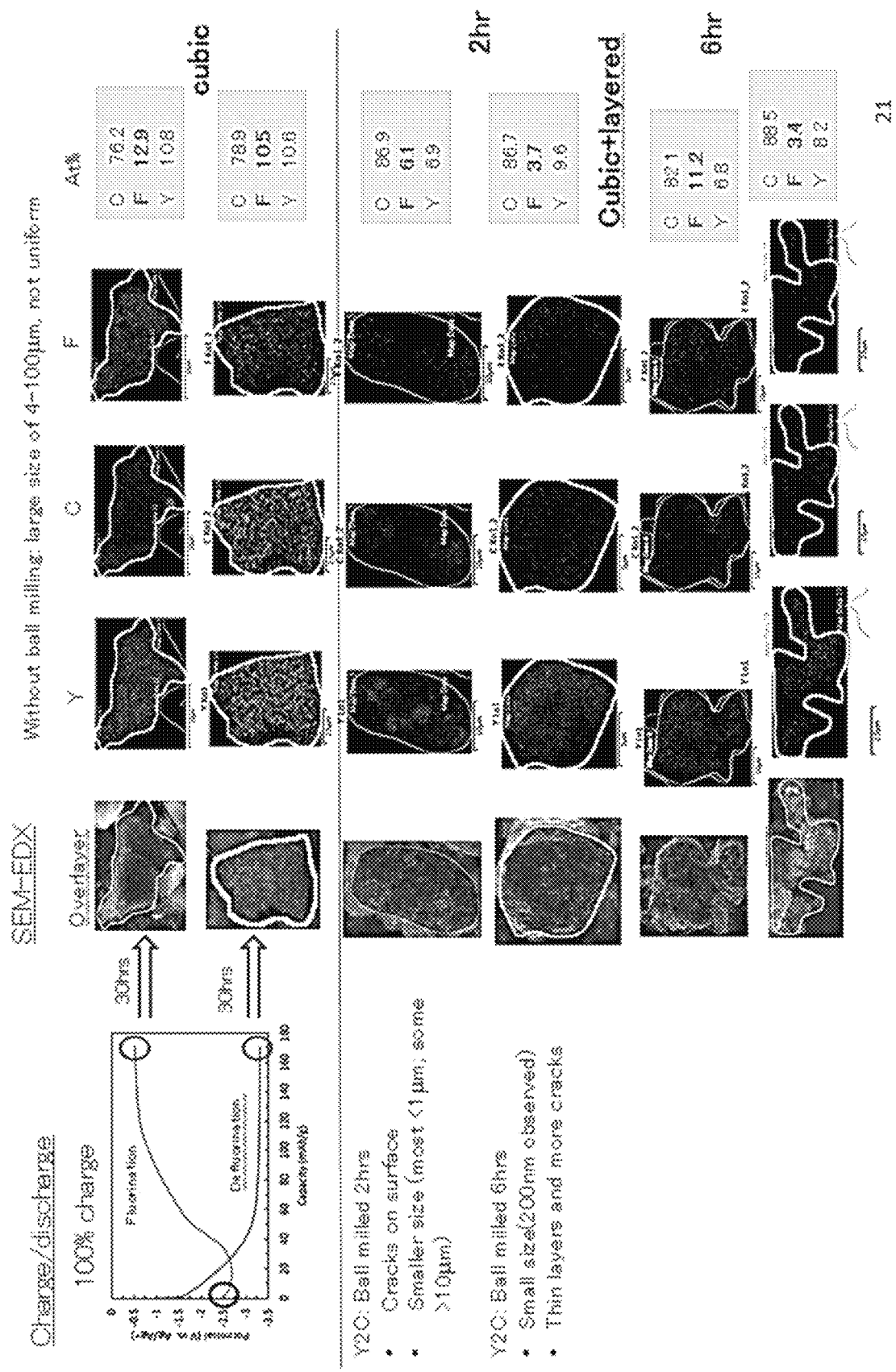
FIG. 18 depicts charge/discharge(fluorination/defluorination) profile of c-$Y_2C$ obtained by hydrogen brittling; and SEM-EDX: elements analysis after charge/discharge of various $Y_2C$ particles.
Figure 19A:
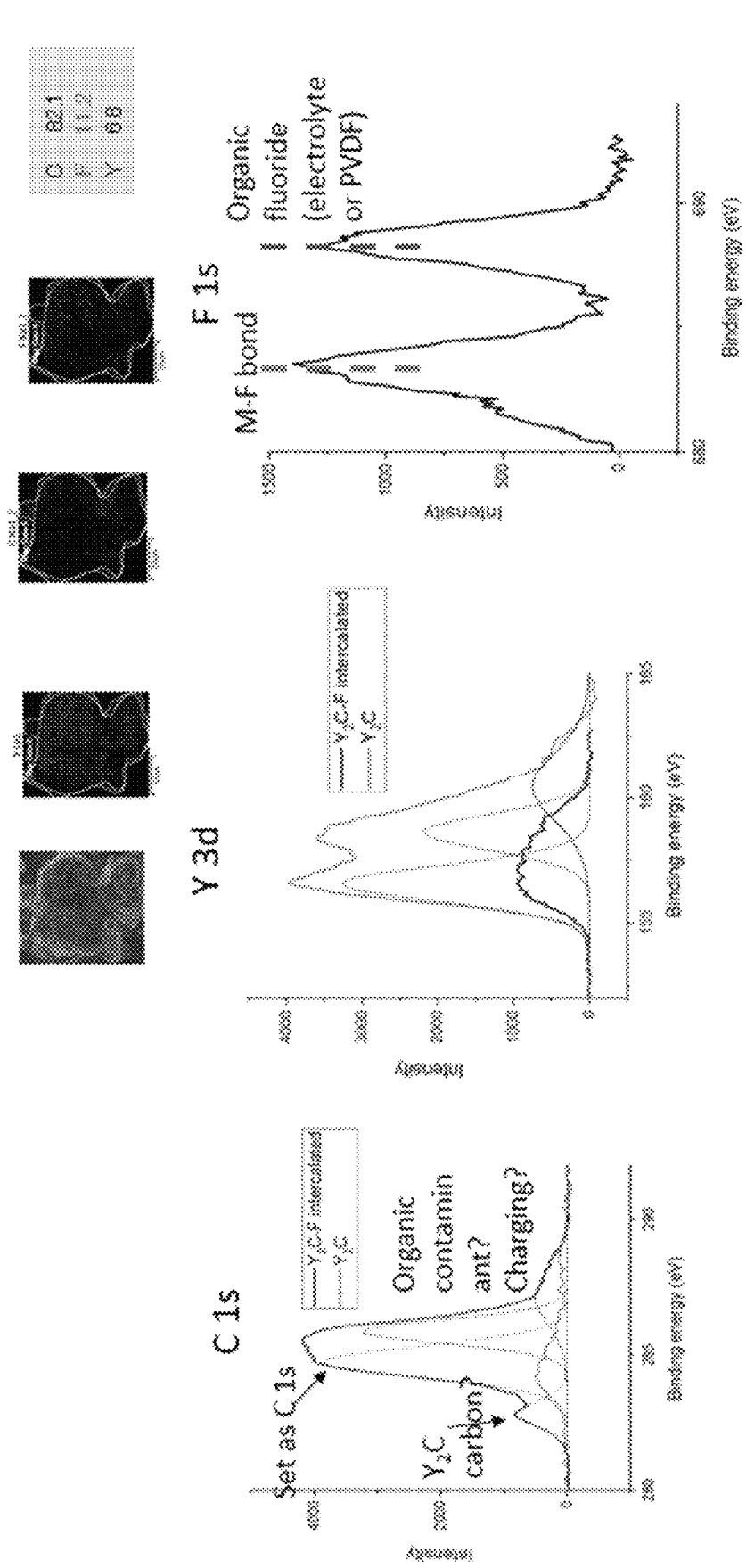
FIGS. 19A and 19B depict XPS (X-ray photoelectron spectroscopy) profiles of $Y_2C$ (ball milling 6 hours) after fluorination/defluorination.
Figure 19B:
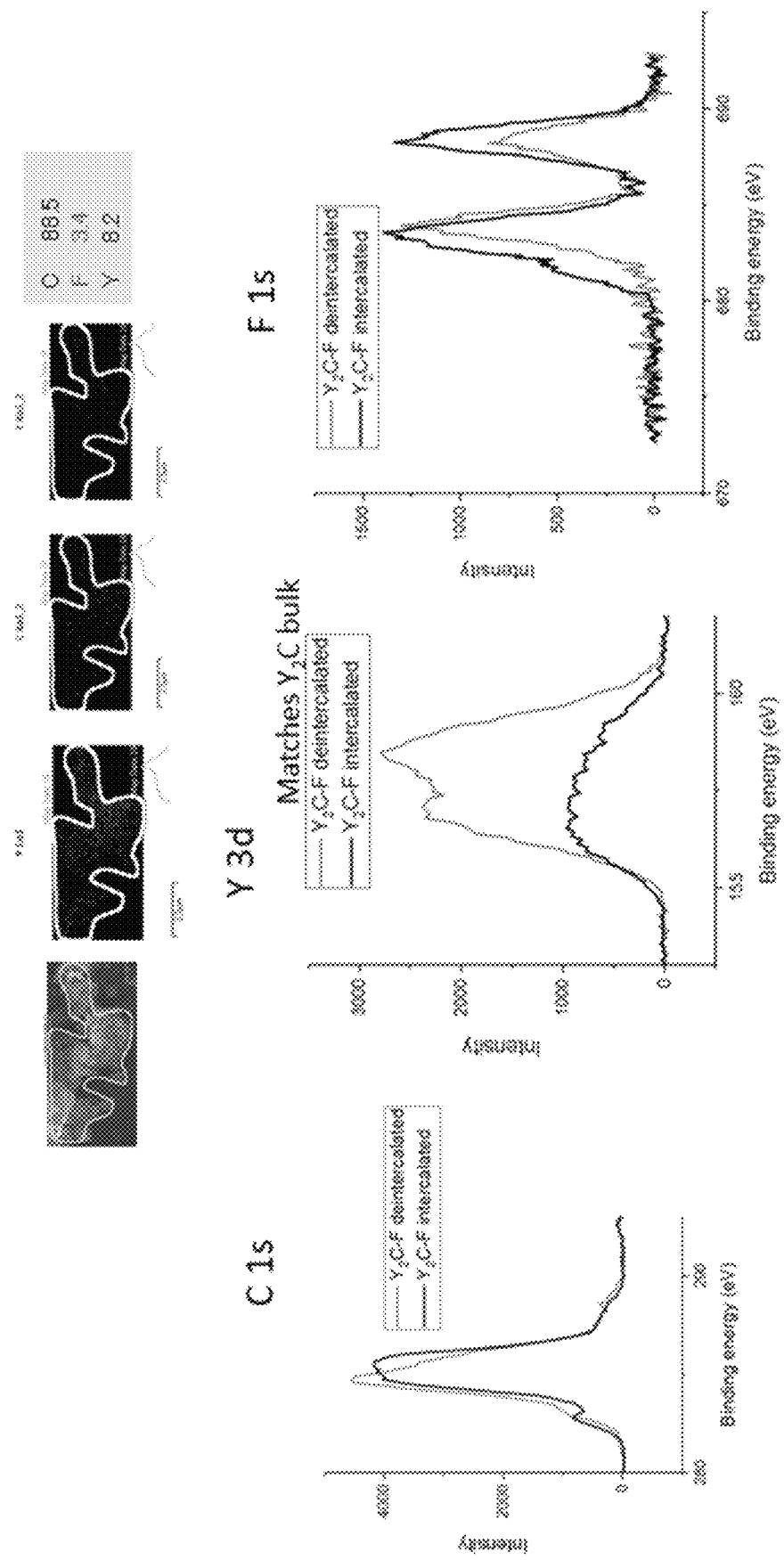

FIG. 18 demonstrates electrochemical activity and SEM-EDX analysis of the $Y_2C$ samples with various phases and particle sizes, i.e., hand-ground c-$Y_2C$ in a size range of 4-100 μm, ball milling 2 hrs c-$Y_2C$ with most of size less than 1 μm, ball milling 6 hrs c-$Y_2C$ and r-$Y_2C$ mixtures with smallest size (200 nm observed). Charge/discharge of the three samples were performed in fluoride-containing electrolytes. The confirmed fluorination of the samples after charge indicates that fluoride ions can hop into interlayers of $Y_2C$ during charge. Partial defluorination were observed after discharge. In large fluorinated c-$Y_2C$ particles, fluoride ions have high barrier. It is not easy to hop out the lattices. In small layered r-$Y_2C$ particles, fluoride ions are much easier to hop out of interlayers compared to large c-$Y_2C$. Therefore, small r-$Y_2C$ particles show good reversibility of fluorination/defluorination. FIGS. 19A and 19B depict XPS (X-ray photoelectron spectroscopy) profiles of partial r-$Y_2C$ (ball milling 6 hours) after charge/discharge, which further confirm good reversibility of r-$Y_2C$ fluorination/defluorination.

Example 4

Figure 20:
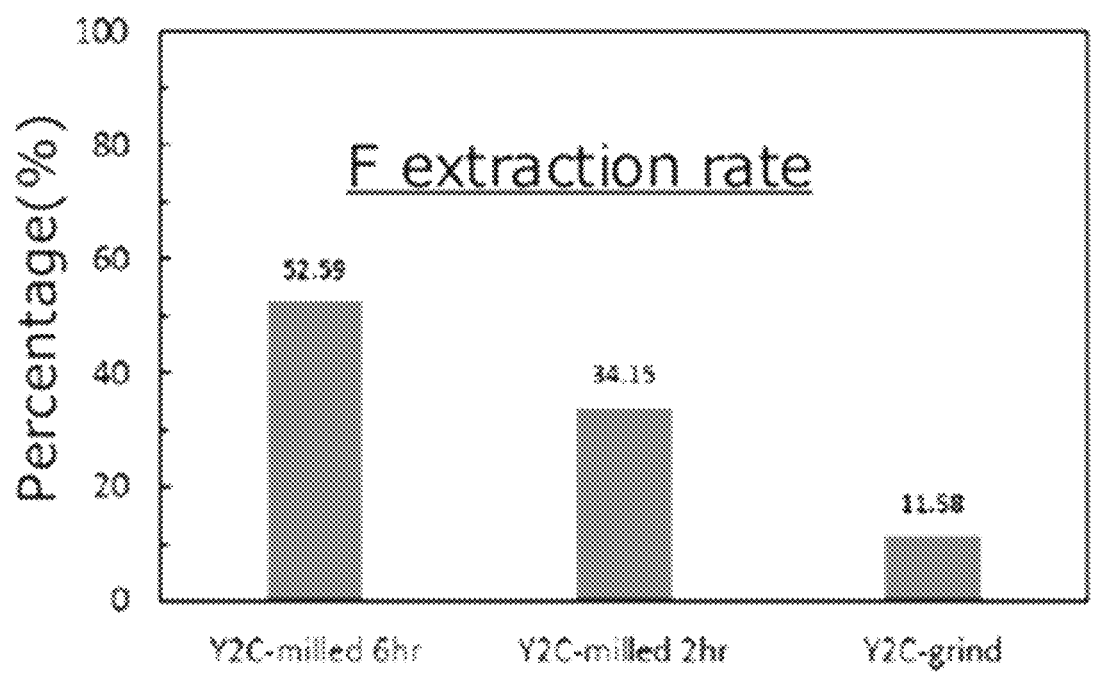
FIG. 20 depicts a percentage of Fluoride ion extraction rate as a function of the size-reducing step.
Figure 21:
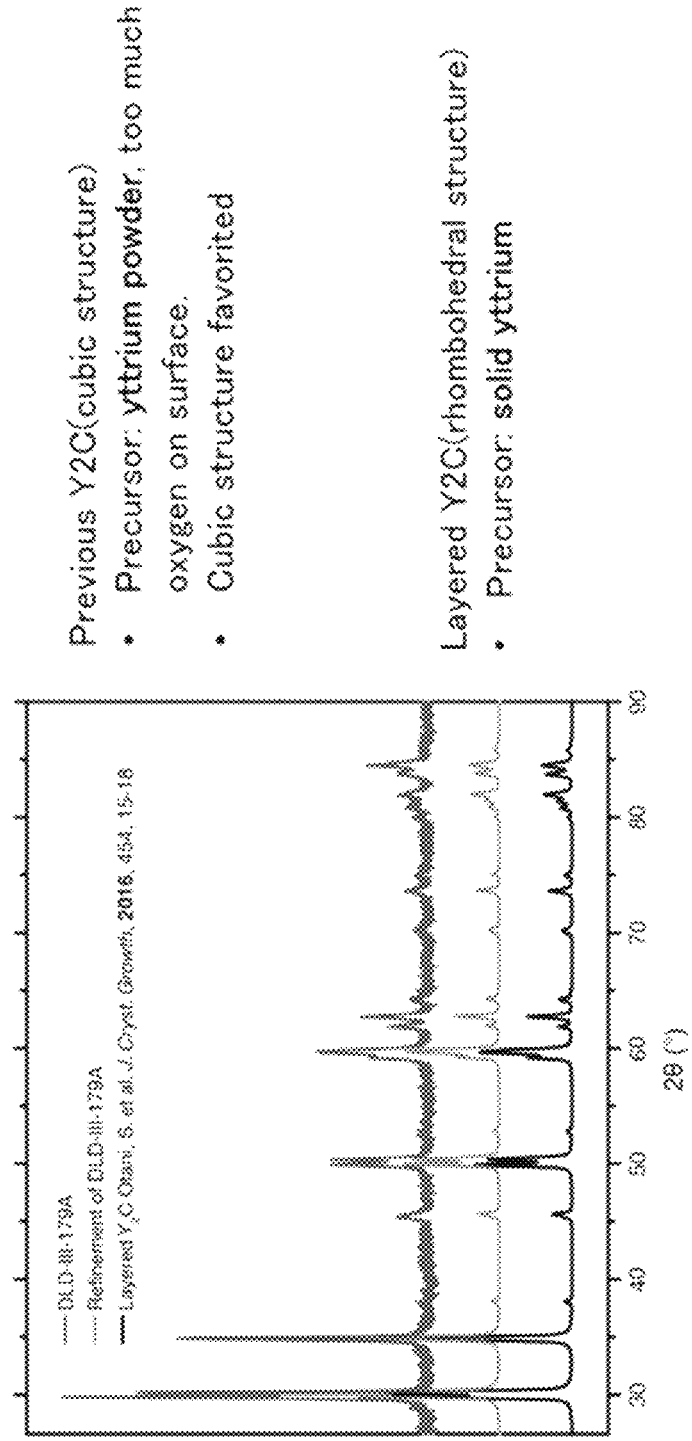
FIG. 21 depicts XRD pattern of phase-pure layered $Y_2C$ (r-YcC).
Figure 22:
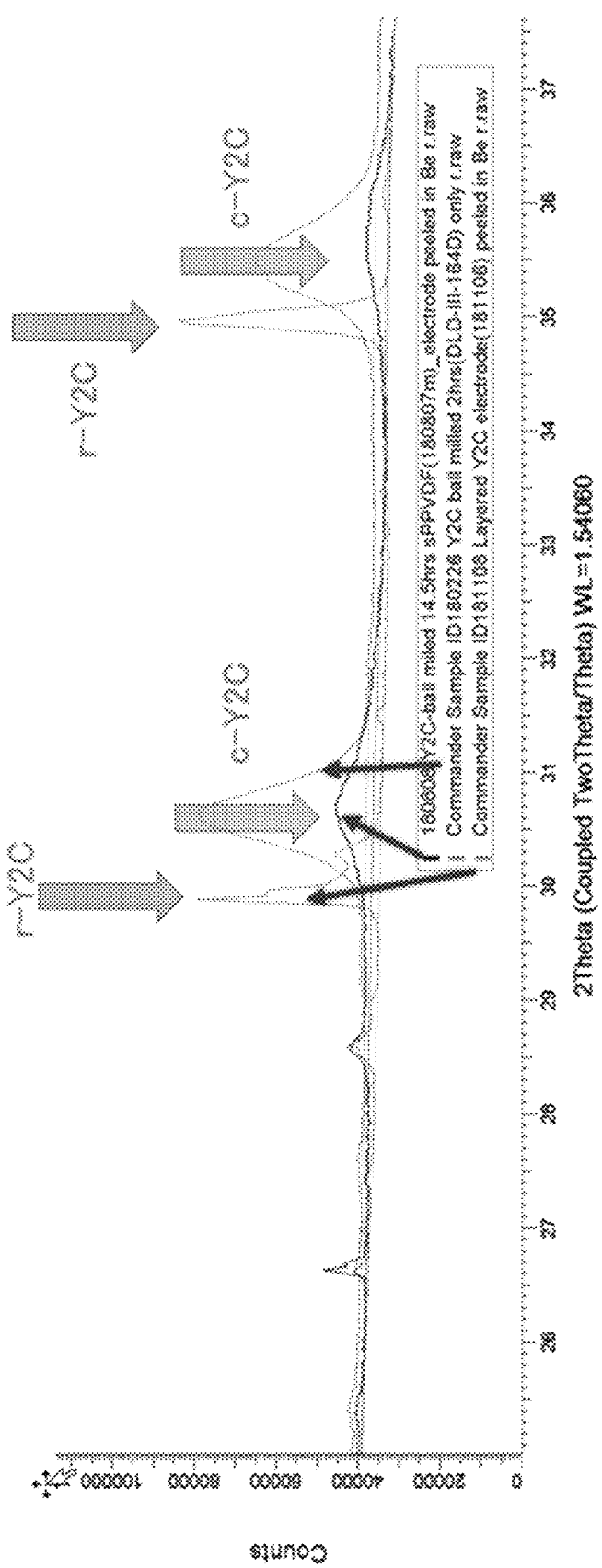
FIG. 22 depicts XRD comparison of r-$Y_2C$ and c-$Y_2C$.
Figure 23A:
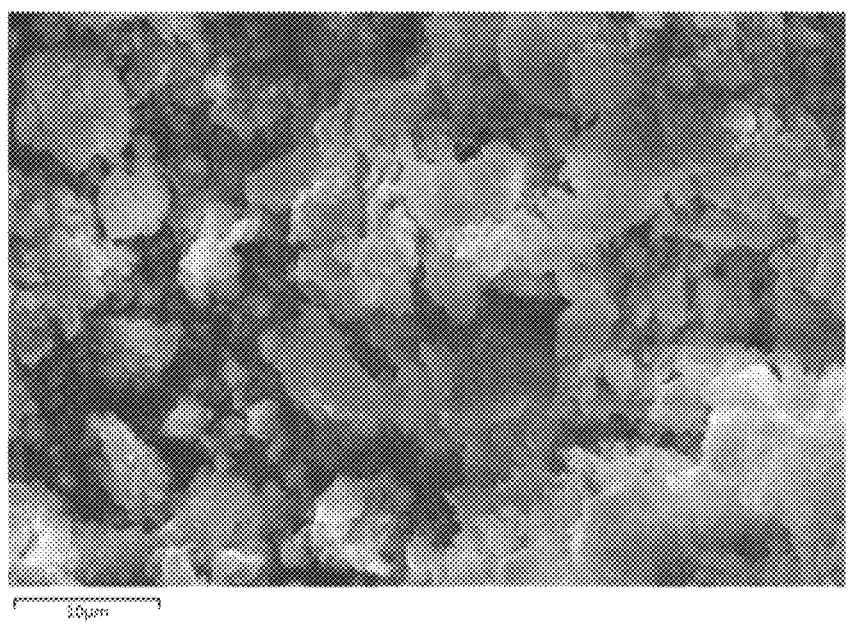
FIG. 23A depicts an SEM image of the r-$Y_2C$ electrode peeled.
Figure 23B:
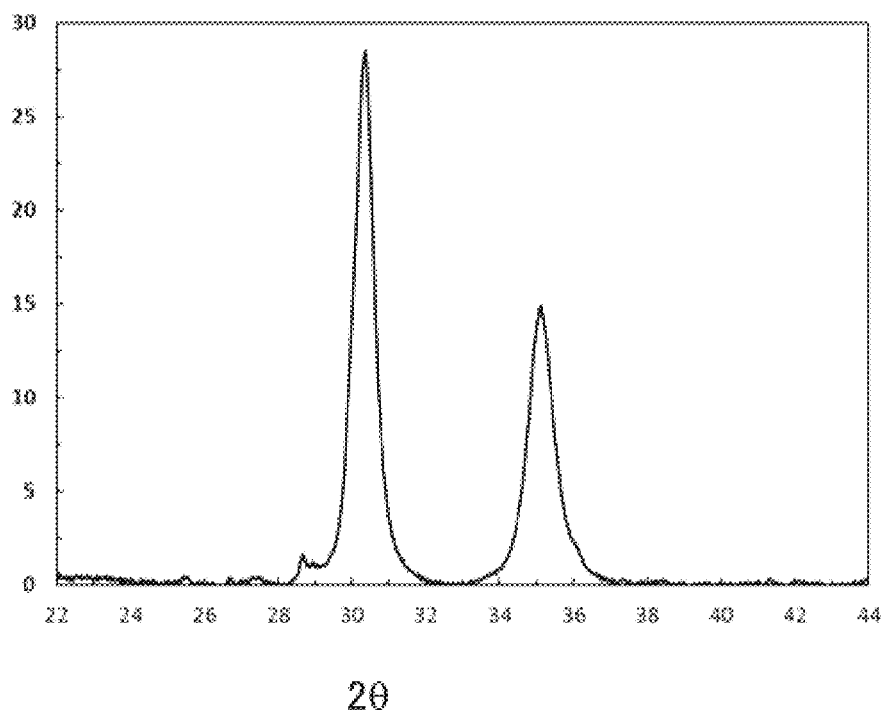
FIG. 23B depicts the XRD pattern of the r-$Y_2C$ electrode.
Figure 24A:
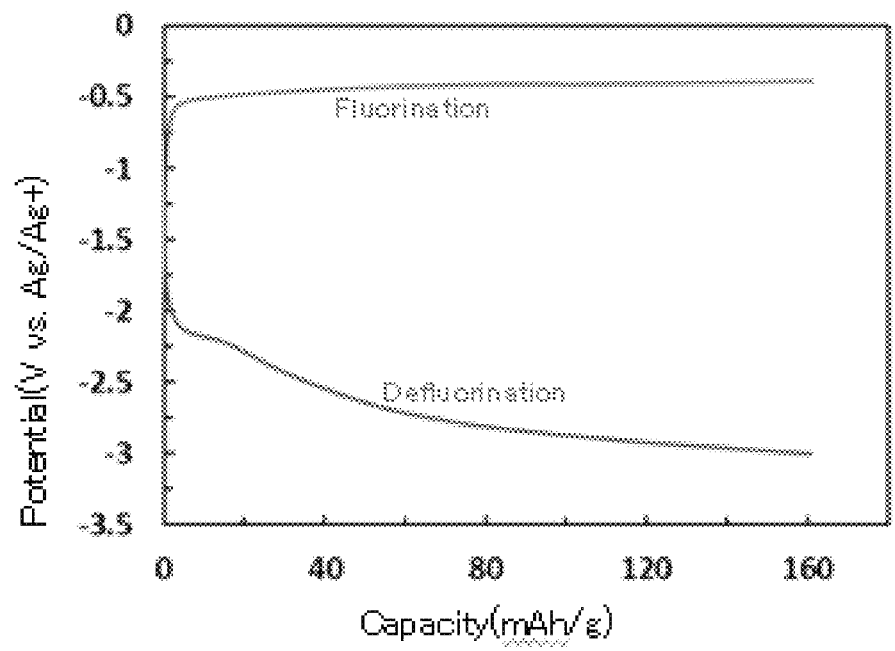
FIG. 24A depicts fluorination/defluorination profile of r-$Y_2C$.
Figure 24:
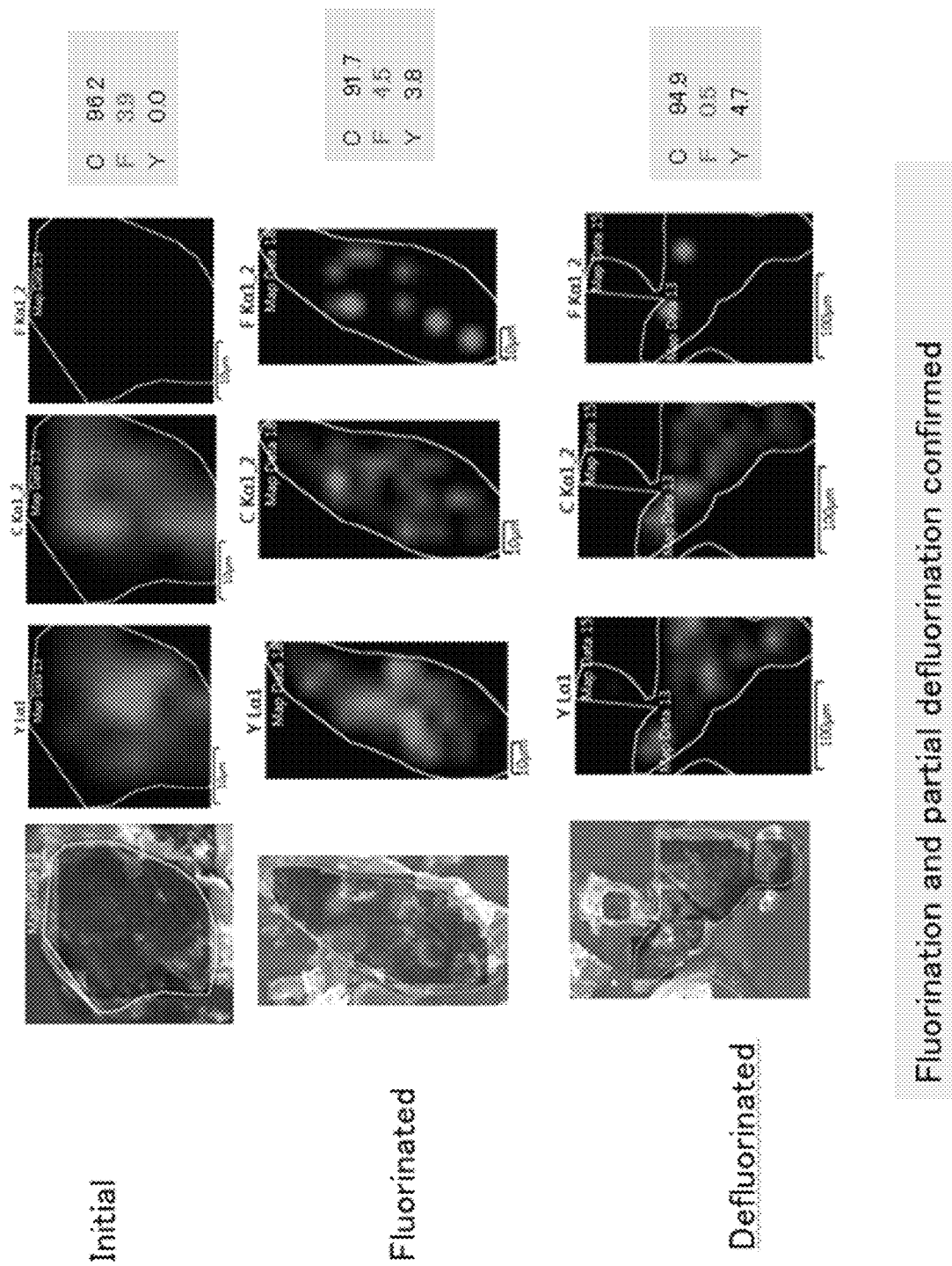
FIG. 24B depicts SEM-EDX analysis, FIG. 24C XRD patterns of r-$Y_2C$ before and after fluorination/defluorination and FIG. 24D enlarged XRD patterns.
Figure 24C:
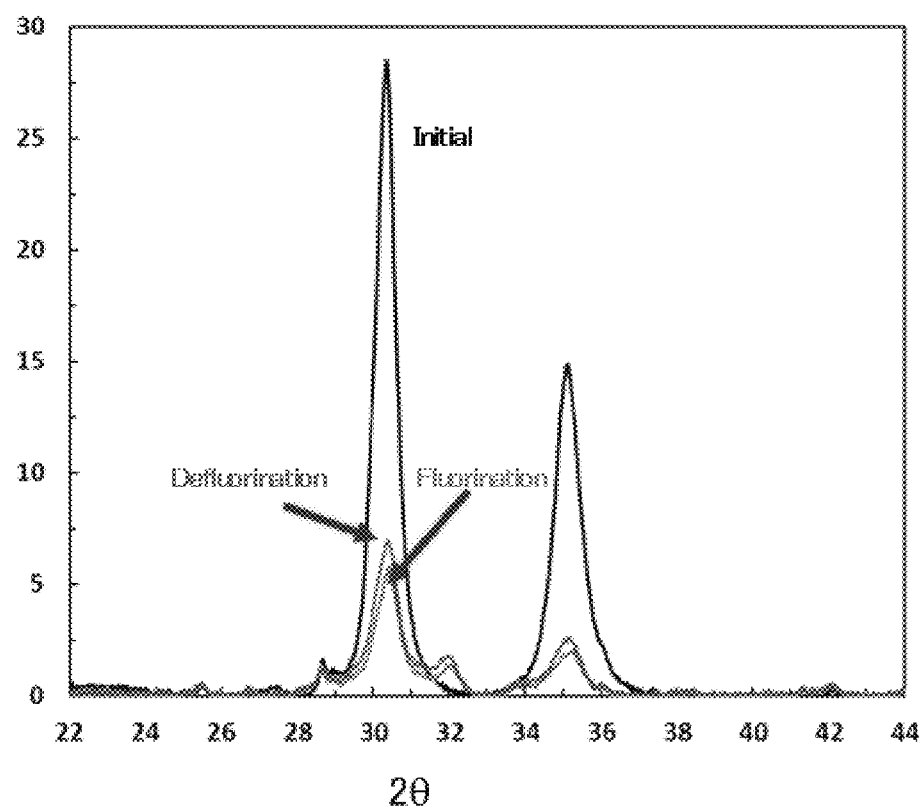
Figure 24D:
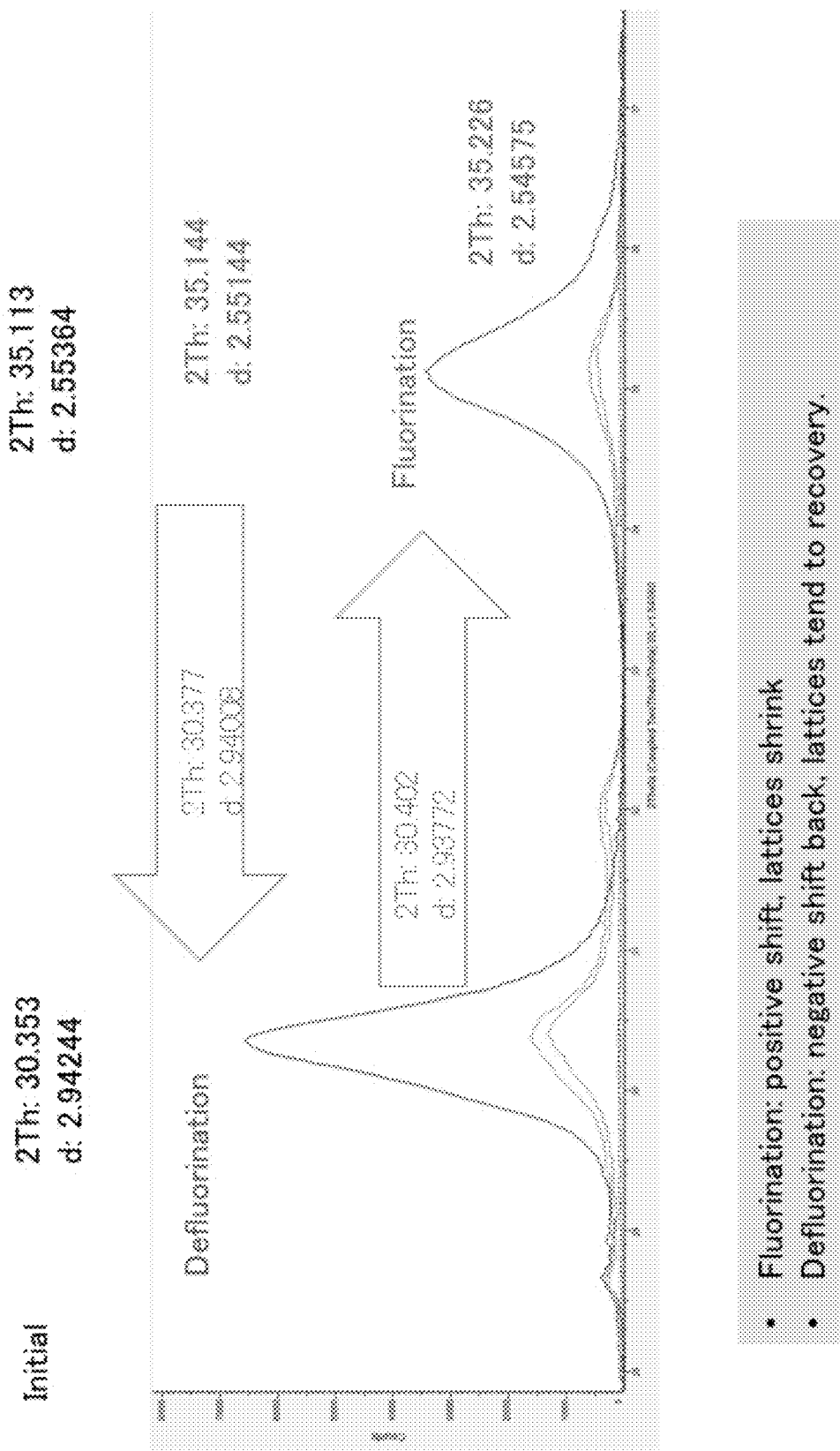
Figure 25:
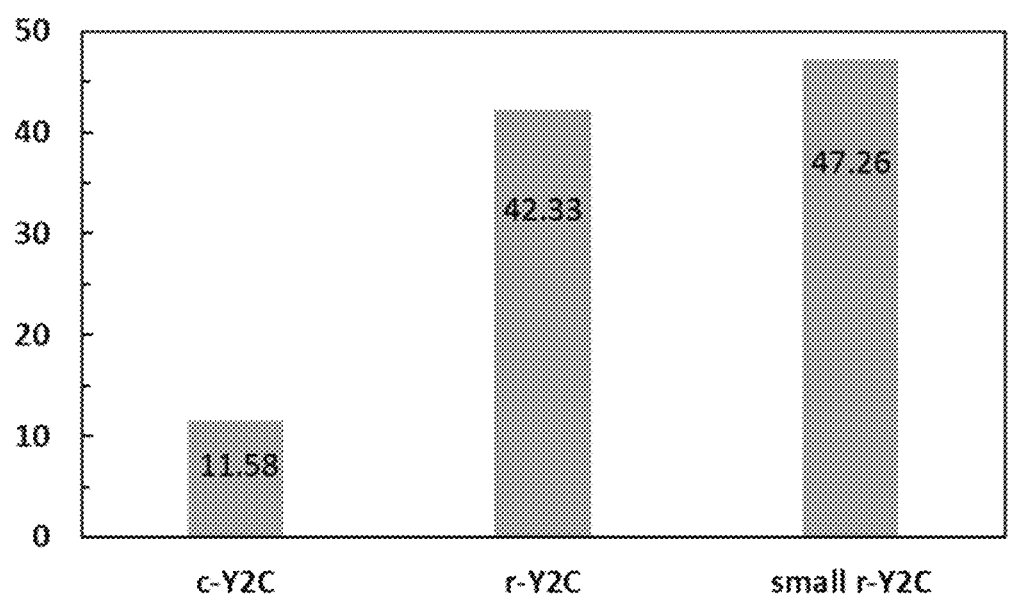
FIG. 25 depicts a percentage of fluoride ion extraction rate as various structures of $Y_2C$.

FIG. 20 shows a percentage of Fluoride extraction rate as a function of various size reducing steps. Based on EDX analysis for the various Y$_2$C samples before/after fluorination/defluorination, it was shown that the Fluoride extraction rate is higher when Y$_2$C is ball milled for 6 hours.

Example 5

Figure 26:
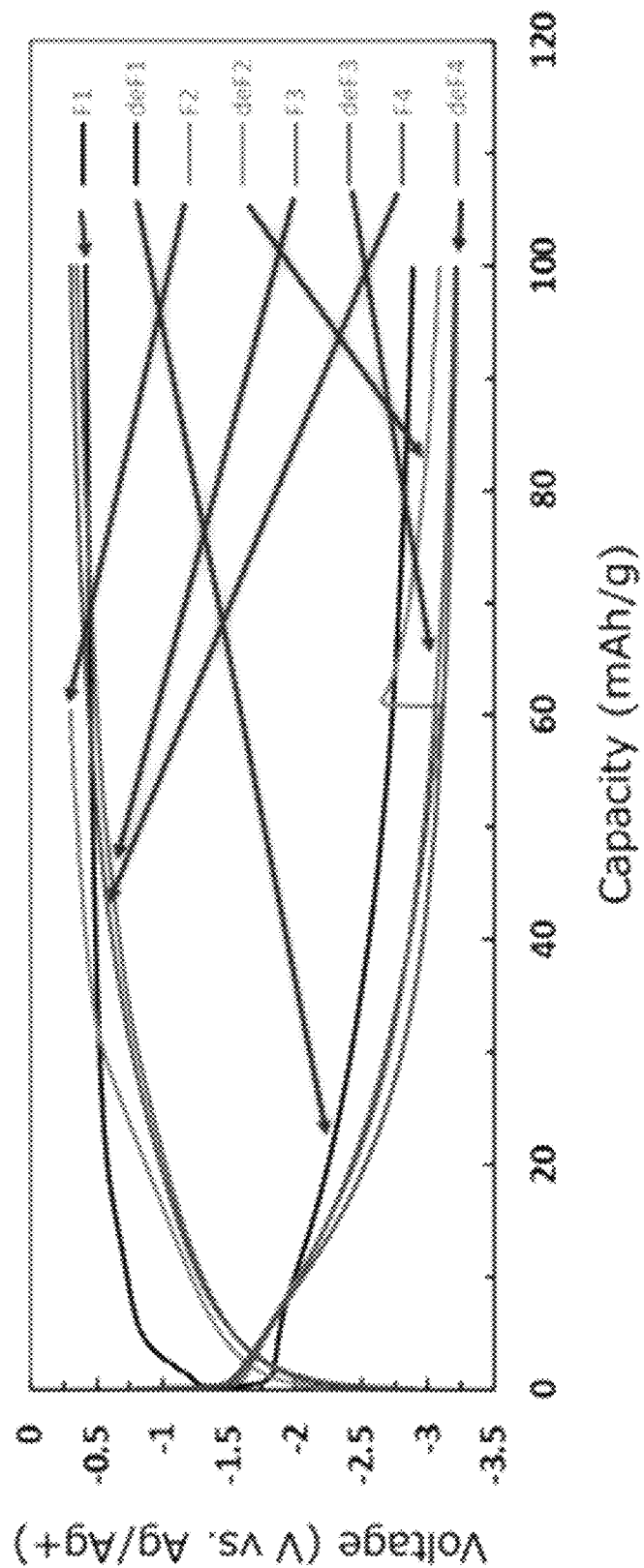
FIG. 26 depicts fluorination/defluorination cycling of r-$Y_2C$.

FIG. 26 shows fluorination/defluorination cycling of r-Y$_2$C in 1M N,N,N-trimethyl-N-neopentylammonium fluoride (Np1F)/bis(2,2,2-trifluoroethyl)ether (BTFE) in a half cell configuration. Four cycles were achieved. It indicates electrochemical activity and reversibility of Y$_2$C in fluoride-containing electrolytes at room temperature.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An electrochemically active structure comprising a crystalline electrode comprising:
   a nitride or carbide of at least one of: an alkaline earth metal, a transition metal, a lanthanide metal, or a combination thereof,
   wherein the electrode has a lattice capable of intercalating at least one anion, thereby releasing at least one electron into an external circuit; and
   wherein a change in lattice volume of the electrode upon intercalating the at least one anion is less than about 40%.

2. The electrochemically active structure of claim 1, wherein the electrode comprises a nitride or carbide efof one or more of Ca, Sr, Ba, Mg, Y, Sc, Gd.

3. The electrochemically active structure of claim 1, wherein the electrode comprises a nitride or carbide of one or more of Y, Sc, Gd.

4. The electrochemically active structure of claim 1, wherein the electrode comprises a nitride.

5. The electrochemically active structure of claim 1, wherein the electrode comprises a carbide.

6. The electrochemically active structure of claim 1, wherein the change in lattice volume of the electrode upon intercalating the at least one anion is less than about 30%.

7. The electrochemically active structure of claim 1, wherein the electrode comprises two or more positively charged layers and wherein the electrode has a predetermined interlayer distance.

8. The electrochemically active structure of claim 7, wherein the predetermined interlayer distance is from about 2.8 Å to about 5 Å.

9. The electrochemically active structure of claim 1, wherein the anion is a fluoride ion.

10. The electrochemically active structure of claim 1, wherein the electrode has a theoretical gravimetric capacity from about 140 mAh/g to about 650 mAh/g.

11. The electrochemically active structure of claim 1, wherein the electride is further capable of intercalating an additional anion having a size larger than the at least one anion, wherein the intercalation of the additional anion does not release an electron into the external circuit, and wherein the additional anion prevents a change in the lattice volume upon intercalating of the at least one anion.

12. The electrochemically active structure of claim 11, wherein the additional anion is chloride.

13. A battery comprising a cathode and an anode comprising a crystalline electride comprising at least one layer comprising a nitride or carbide of one or more of an alkaline earth metal, a transition metal, a lanthanide, or a combination thereof;
   wherein the electrode has a lattice capable of intercalating at least one anion, thereby releasing at least one electron into an external circuit; and wherein a change in lattice volume of the electrode upon intercalating the at least one anion is less than about 40%; wherein the battery has an open circuit voltage from about 1.0 volts to about 4.5 volts and has a theoretical gravimetric density from about 300 to about 2,000 Wh/kg.

14. The battery of claim 13, wherein the electrode is a nitride or carbide of one or more of Ca, Sr, Ba, Mg, Y, Sc, Gd.

15. The battery of claim 13, wherein the electrode comprises two or more positively charged layers and wherein the electrode has a predetermined interlayer distance.

16. A method comprising:
   a) reacting a metal represented by a formula A, wherein A comprises Ca, Sr, Ba, Mg, Y, Sc, Gd, or a combination thereof by reaction of with a carbon under conditions effective to form a compound represented by a formula A$_2$C; and
   b) size reducing the compound represented by a formula A$_2$C wherein A comprises Ca, Sr, Ba, Mg, Y, Sc, Gd, or a combination thereof, to form a crystalline carbide electride,
   wherein the carbide crystalline electride has a lattice capable of intercalating at least one ion, thereby releasing at least one electron into an external circuit; and
   wherein a change in lattice volume of the electrode upon intercalation is less than about 40%.

17. The method of claim 16, wherein the conditions effective to form the compound represented by a formula A$_2$C comprise applying heating to a temperature from about 500° C. to about 3000° C. under pressure from about 1 to about 760 mmHg.

18. The method of claim 16, wherein the size-reducing step comprises ball milling or further comprises ball milling.

19. The method of claim 16, wherein the crystalline electride has a particle a size from about 100 nm to about 150 μm.

* * * * *